US012204282B2

(12) United States Patent
Leister et al.

(10) Patent No.: US 12,204,282 B2
(45) Date of Patent: Jan. 21, 2025

(54) METHOD AND HOLOGRAPHIC APPARATUS FOR THE THREE-DIMENSIONAL REPRESENTATION OF SCENES

(71) Applicant: SEEREAL TECHNOLGIES S.A., Munsbach (LU)

(72) Inventors: Norbert Leister, Dresden Sachsen (DE); Grigory Lazarev, Berlin (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 482 days.

(21) Appl. No.: 17/598,253

(22) PCT Filed: Mar. 23, 2020

(86) PCT No.: PCT/EP2020/058032
§ 371 (c)(1),
(2) Date: Sep. 25, 2021

(87) PCT Pub. No.: WO2020/193489
PCT Pub. Date: Oct. 1, 2020

(65) Prior Publication Data
US 2022/0179360 A1    Jun. 9, 2022

(30) Foreign Application Priority Data

Mar. 25, 2019  (EP) .................................. 19164990

(51) Int. Cl.
*G03H 1/22* (2006.01)
*G03H 1/08* (2006.01)

(52) U.S. Cl.
CPC ......... *G03H 1/2294* (2013.01); *G03H 1/0841* (2013.01); *G03H 2001/2236* (2013.01); *G03H 2210/30* (2013.01); *G03H 2222/34* (2013.01)

(58) Field of Classification Search
CPC ............... G03H 1/2294; G03H 1/0841; G03H 2001/2236; G03H 2210/30;
(Continued)

(56) References Cited

U.S. PATENT DOCUMENTS 10,295,959 B2   5/2019 Futterer
10,678,188 B2   6/2020 Zschau et al.
(Continued)

FOREIGN PATENT DOCUMENTS

DE    102011005154 A1    6/2012
DE    102012100209 A1    9/2012
(Continued)

OTHER PUBLICATIONS

International Search Report, dated Aug. 7, 2020, and Written Opinion issued in International Application No. PCT/EP2020/058032.

*Primary Examiner* — Arnel C Lavarias
(74) *Attorney, Agent, or Firm* — Saul Ewing LLP

(57) ABSTRACT

An apparatus and method for the three-dimensional representation of scenes including an illumination device and a spatial light modulation device for modulating incident light. A hologram is encoded into the spatial light modulation device and the hologram is composed of individual sub-holograms, in which an object point of an object of the scene to be reconstructed by the hologram is encoded in each case. The spatial light modulation device is illuminated with substantially coherent light by the illumination device in at least one illumination section. An amplitude distribution and a phase distribution for representing the scene and amplitude values and phase values derived therefrom are determined for encoding the spatial light modulation device. The amplitude of the light incident on the spatial light modulation device in the respective illumination section is set based on at least one parameter at least determined from the amplitude values in this illumination section.

36 Claims, 10 Drawing Sheets

(58) Field of Classification Search
CPC .... G03H 2222/34; G03H 1/00; G03H 1/0005; G03H 2001/0088; G03H 2001/0224; G03H 1/04; G03H 1/0443; G03H 2001/045; G03H 2001/0454; G03H 1/08; G03H 1/0808; G03H 2001/0816; G03H 2001/0825; G03H 2001/0833; G03H 1/0866; G03H 2001/0883; G03H 1/0891; G03H 1/16; G03H 1/22; G03H 1/2202; G03H 2001/2223; G03H 2001/2234
USPC .................. 359/9, 1, 13, 22, 29, 32, 33, 35
See application file for complete search history.

(56) References Cited

U.S. PATENT DOCUMENTS

| | | |
|---|---|---|
| 10,782,522 B2 | 9/2020 | Futterer |
| 2006/0250671 A1 | 11/2006 | Schwerdtner et al. |
| 2008/0212153 A1 | 9/2008 | Haussler et al. |
| 2010/0149611 A1 | 6/2010 | Leister |
| 2010/0271675 A1* | 10/2010 | Leister ............... G03H 1/08 359/9 |
| 2010/0289870 A1 | 11/2010 | Leister |
| 2012/0092750 A1 | 4/2012 | Kroll et al. |
| 2013/0188391 A1 | 7/2013 | Futterer |
| 2014/0016051 A1 | 1/2014 | Kroll et al. |
| 2014/0198141 A1 | 7/2014 | Kasazumi et al. |
| 2021/0208536 A1 | 7/2021 | Reichelt et al. |
| 2021/0223738 A1* | 7/2021 | Futterer ............. G03H 1/268 |

FOREIGN PATENT DOCUMENTS

| | | |
|---|---|---|
| DE | 102016100793 A1 | 7/2017 |
| JP | 2010525384 A * | 7/2010 |
| WO | 2006/116965 | 11/2006 |
| WO | 2008025839 A1 | 3/2008 |
| WO | 2008138885 A2 | 11/2008 |
| WO | 2010149583 A1 | 12/2010 |
| WO | 2012004016 A1 | 1/2012 |
| WO | 2012062681 A1 | 5/2012 |

* cited by examiner

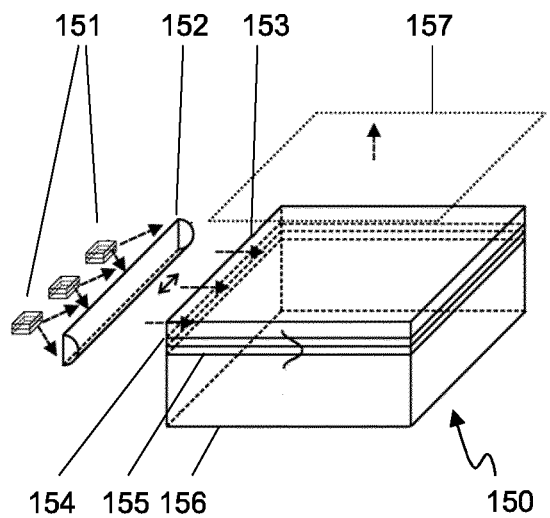 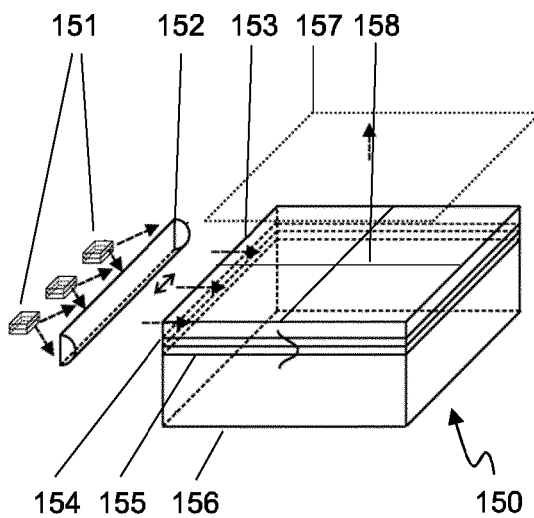
Fig. 11a  Fig. 11b
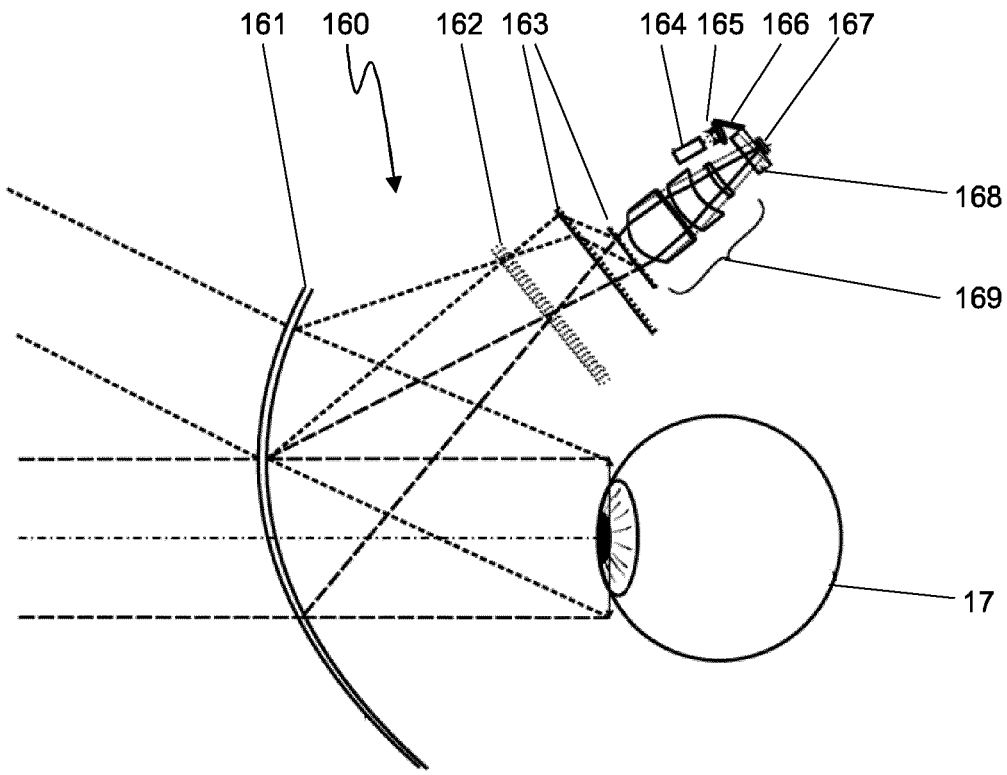
Fig. 12

METHOD AND HOLOGRAPHIC APPARATUS FOR THE THREE-DIMENSIONAL REPRESENTATION OF SCENES

CROSS REFERENCE TO RELATED APPLICATIONS

This application claims the priority of PCT/EP2020/058032, filed on Mar. 23, 2020, which claims priority to European Application No. EP 19164990.4, filed on Mar. 25, 2019, the entire contents of each of which are incorporated fully herein by reference.

BACKGROUND OF THE INVENTION

The invention relates to a method for the three-dimensional representation of scenes comprising an illumination device and at least one spatial light modulation device for modulating incident light, where a hologram is encoded into the at least one spatial light modulation device and the hologram is composed of individual sub-holograms, in which an object point of an object of the scene to be reconstructed with the hologram is encoded in each case, where the modulation of the incident light is provided for reconstructing an object point of the three-dimensional scene. The invention furthermore relates to a holographic apparatus for representing three-dimensional scenes, which is suitable for carrying out such a method according to the invention.

The computer-generated holographic representation of three-dimensional scenes is based on the complex-valued modulation of a sufficiently coherent and planar light wavefront. The use of pixelated spatial light modulation devices that can influence the amplitude and the phase of the incident light for the complex-valued modulation of a collimated light beam provided by an illumination device is known. In this case, the amplitude can be set by local damping or else by interference with adjacent light components with an offset phase. Since known light modulation devices can only influence either the phase or the amplitude of a light beam in a targeted manner, sandwich arrangements which have an amplitude modulator and an adjacent phase modulator are known. In the case of such a sandwich arrangement, the amplitude values are written into the amplitude modulator and the phase values are written into the phase modulator. A complex-valued modulation is implemented by virtue of light successively passing through respectively one pixel of the amplitude modulator and one pixel of the phase modulator along the light path. It is also possible for phase pixels and amplitude pixels to be integrated in a single light modulator and to be successively passed through along the light path with the aid of mirror elements. It is also possible to set the phase and the amplitude by means of merely a phase modulator with the aid of macro pixels. To this end, two or more pixels of the phase modulator are combined to form one macro pixel in each case, the pixels are suitably controlled and the light of these pixels is suitably superposed such that the desired phase and, as a result of interference of the light passing through the pixels of a macro pixel, also the desired amplitude are present at the macro pixel.

It is also possible to set the phase and the amplitude by means of merely a phase modulator with the aid of an iterative hologram calculation. Providing the following description does not refer to a specific type of light modulation device, the embodiments should relate to all of the aforementioned types of light modulation devices.

Use can made of light modulation devices (SLM) with a transmissive and/or reflective embodiment. To determine suitable control signals for setting the amplitudes and the phases, use is made of various encoding methods which provide, either directly or iteratively, a suitable amplitude or phase distribution and corresponding control signals for controlling the pixels of the light modulation device. Light modulation devices usually have a restricted number of different representable modulation levels, for example a restricted number of different amplitude values, referred to as grayscale levels below, or different phase values. A light modulation device with a resolution of 8 bits has, for example, 2 to the power of 8, i.e., 256, representable amplitude or phase values.

To reduce the computational effort for hologram encoding, it is known to restrict the three-dimensional representation or scene to only a number of spatially restricted virtual observer windows present in an observer plane, which can follow the eye positions of observers of the scene. Individual object points of the scene are each encoded in a sub-hologram, where the sub-holograms form portions of the overall hologram on the holographic light modulation device and the individual object points are generated by means of the associated sub-holograms. The sub-holograms can overlap one another in the process.

Generally, a high amplitude dynamic range occurs in the case of a hologram calculation for a holographic apparatus or display. The amplitude values of the hologram pixels calculated for representing a three-dimensional object or scene can assume both very small values and very large values. By way of example, the amplitude can differ by a factor of 20 000. In the case of a holographic apparatus or display for representing three-dimensional scenes by means of sub-holograms, object points of the three-dimensional scene generally have small sub-holograms of a few pixels near the hologram plane, and consequently near the light modulation device. Object points of a three-dimensional scene far away from the hologram plane or the light modulation device can be generated by relatively large sub-holograms, each with a correspondingly greater number of pixels. The amplitude of a sub-hologram required to reconstruct an object point with a certain intensity is approximately inversely proportional to the square root of the number of pixels in the sub-hologram. Thus, a small sub-hologram, for example only having a size of 1×1 pixel, needs to have a significantly higher amplitude to generate an object point of equal brightness than a large sub-hologram, for example with a size of 200×200 pixels, specifically an amplitude greater by a factor of 200 in this example. Additionally, a three-dimensional scene generally has a certain brightness dynamic range, i.e., the three-dimensional scene can consist of in part very bright object points and in part dark object points. By way of example, compared to a dark object point, a bright object point can have an amplitude greater by a factor of 100. An object point with a 1×1 pixel sub-hologram which is brighter by a factor of 100 in respect of the amplitude must then, for example, have an amplitude greater by a factor of 200×100, i.e., a factor of 20 000, when compared to a darker object point with the 200×200 pixel sub-hologram. However, if the amplitude display only has 8 bits, i.e., 256 grayscale levels, this factor of 20 000 is not representable without limitations.

For this reason, setting the required amplitudes of the sub-holograms is difficult, for example for a light modulation device with a restricted number of representable grayscale values, if, firstly, very bright object points with small sub-holograms should be reconstructed close to the hologram plane and, secondly, dark object points with large sub-holograms should be reconstructed far away from the hologram plane. If such an overall hologram which is composed of different sub-holograms, i.e., sub-holograms of different size and with differently bright object points, is written into a light modulation device which has only a restricted contrast and/or restricted number of grayscale levels available, for example an intensity contrast of less than 1000:1 or only 8-bits, i.e., 256 grayscale levels, the problem of not reproducing all brightness levels of the object points with the correct ratio to one another may occur. What such a restricted contrast may lead to is that dark object points which are reconstructed with correspondingly large sub-holograms far away from the hologram plane are represented too bright, while bright object points which are generated close to the hologram plane by correspondingly small sub-holograms appear too dark.

Additionally, it may be the case that it is no longer possible to distinguish between different hologram amplitude values on account of the restricted number of adjustable grayscale levels. As a result, fine brightness gradations in the reconstructed object points may no longer be correctly representable under certain circumstances. If a colored object point is represented as a superposition of reconstructions at different wavelengths, for example of the primary colors red, green and blue, then its color, corresponding to differently large red, green and blue components, may no longer be correctly representable under certain circumstances either.

In the case of a light modulation device configured as a complex-value sandwich of an amplitude modulator and a phase modulator, the contrast of the reconstruction of a three-dimensional scene is determined by the contrast of the amplitude modulator in particular. The amplitude is substantially proportional to the square root of the intensity. Therefore, the amplitude can only be represented in a ratio of approximately 32:1 using an amplitude modulator which for example has a contrast of 1000:1.

Methods of iterative phase encoding are known for the use of pure phase modulators as light modulation devices. In the case of iterative phase encoding, the amplitudes of the hologram pixels are set to the same value in each cycle during the iteration. This is facilitated by virtue of an additional noise window, into which redundant light is directed, being provided next to a virtual observer window in an observer plane which can track the eye of an observer when the observer changes their position. All pixels of the light modulation device have the same transmission but the light is directed differently. Light from pixels of a region with low-amplitude sub-holograms on the light modulation device are then predominantly directed into the noise window outside of the virtual observer window and light from a region on the light modulation device with high-amplitude sub-holograms is predominantly directed into the virtual observer window. Consequently, directing the light into different regions by way of the phase modulator replaces the direct amplitude modulation by absorption of light in the pixels, as would ordinarily occur in an amplitude modulator. Even in the case of iterative phase encoding, complex-valued overall holograms with a large dynamic range of the amplitudes as a result of constructing or overlaying very different sub-holograms are more difficult to be represented satisfactorily than overall holograms with similar amplitudes as a result of constructing or overlaying similar sub-holograms. Thus, object points of a three-dimensional (3-D) scene may be reconstructed with an incorrect brightness as a result of an insufficient iterative calculation.

By way of example, too few iteration steps of a phase iteration generally lead to the relative brightness levels of the object points being incorrect and fine brightness gradations of the object points of the reconstructed scene not being visible. Although additional iteration steps improve the relative brightness and fineness of the brightness gradations, they generally however also lead to a reconstruction that is darker overall. This is understandable since light from low-amplitude sub-holograms is deflected into the noise window but no additional light can be directed into the virtual observer window from the high-amplitude sub-holograms. Consequently, the iterative calculation can only decrease and not increase the intensity of object points.

In all the aforementioned cases, what is desired is a reconstruction that is as bright as possible with, at the same time, the correct reproduction of dark or black regions of a 3-D scene and a correct reproduction of brightness gradations in the scene.

Adapting the brightness of a backlight to the image content is known for two-dimensional reproduction devices or displays. In the process, the brightness of the backlight is controlled globally (global dimming) or locally (local dimming), depending on the desired brightness of the pixels. This measure can increase the contrast of the display and simultaneously reduce the power needs of the display.

The brightness of the backlight is set higher in the case of global dimming if, overall, bright content of the reconstructed scene is reproduced. The brightness of the backlight is down-regulated if overall dark content of the reconstructed scene is reproduced. By way of example, in the case where a movie is reproduced, scenes set on a sunny day would be reproduced with full brightness of the backlight and scenes set at night would be reproduced with a down-regulated brightness of the backlight.

Instead of a static contrast (i.e., maximum brightness to minimum brightness with the same setting of the backlight, i.e., without adapting the backlight), which generally does not exceed a value of 2000:1 in the case of liquid crystal displays (LCD displays), the application of global dimming allows a dynamic contrast (i.e., maximum brightness at the maximum intensity of the backlight to minimum brightness at the minimum intensity of the backlight) in the region of 100 000:1 or even one million:1 to be attained.

Certain regions of the two-dimensional (2D) display are provided with different brightness of the backlight in the case of a local dimming method. In the case of background illumination consisting of a light-emitting diode array (LED array), it would be possible to drive the individual light-emitting diodes (LEDs) with different brightness, for example.

In contrast to conventional 2D displays, holographic displays require a sufficiently coherent illumination. They also require substantially collimated illumination while conventional 2D displays can be illuminated by a large angular spectrum. Thus, conventional backlights cannot be used in a holographic apparatus or display.

WO 2008/025839 A1 discloses a method for generating video holograms in real time for a holographic apparatus having at least one light modulator. A three-dimensional scene decomposed into object points is encoded in the light modulator as an overall hologram and visible as a reconstruction from a visibility region. With each object point of the three-dimensional scene, the visibility range defines a sub-hologram on the light modulator. The center of the sub-hologram is located on a straight line through the object point to be reconstructed in the center of the visibility region. The extent of the sub-hologram is ascertained with the aid of the intercept theorem, where the visibility range through the object point to be reconstructed is traced back to the light modulator. The overall hologram is formed from a superposition of the sub-holograms or is composed of the individual sub-holograms. Provision is made for the contributions of the sub-holograms to the reconstruction of the three-dimensional scene to be determinable from at least one lookup table for each object point.

WO 2006/116965 A1 discloses an illumination device for a controllable light modulator, said illumination device consisting of a number of light sources with assigned lenses. The light sources can be embodied as line light sources or point light sources. The lenses can be present as cylindrical lenses or spherical lenses. The light sources emit sufficiently coherent light and illuminate separate illumination sections on the light modulator. The light sources and the lenses are arranged in such a way that the light is incident in a virtual observer window, through which an observer can observe a three-dimensional scene, after passing through the light modulator. To track the virtual observer window in the case of a movement of the observer it is possible to activate differently arranged light sources per lens. Alternatively, an optical element that is switchable in terms of its local transmission can be provided between the light sources and the lenses and it suitably opens the light path for tracking the virtual observer window in each case. An advantage of the multiple arrangement of light sources and lenses is that use can be made of smaller lenses than in the case of an arrangement with only one lens for the entire light modulator. In this way, the build of the arrangement becomes substantially more compact.

WO 2006/116965 A1 discloses a controllable illumination device for an autostereoscopic or holographic display with an illumination matrix of primary light sources. The light of the primary light sources is fed to a controllable light modulator which forms therefrom a matrix of secondary light sources, the latter illuminating a reproduction matrix, preferably in the form of a stereoscopic or holographic display. In this context, the term secondary light source should be understood to mean that this relates to the image of a primary light source. By controlling the controllable light modulator, diffractive imaging means which image the primary light sources into secondary light sources are formed on said light modulator. By way of example, a primary light source can also be imaged into a plurality of secondary light sources in this case.

By way of a suitable control or spatial displacement of the primary light sources or by way of adapting the computer-generated hologram encoded in the controllable light modulator for representing the secondary light sources, it is possible to adapt the positions and the spatial distribution of the secondary light sources to the content represented by the reproduction matrix and the position of a virtual observer window of one or more observers. By way of the representation brought about by the reproduction matrix, it is possible to track a changing position of an observer.

Below, the term "secondary light source" is used for cases of something which acts like a light source in the optical beam path without a light source being physically present at this location. By way of example, this is the case for the aforementioned imaging of a primary light source into one or more secondary light sources. The use of optical fibers, where a fiber end acts as a secondary light source, is mentioned here as another example. By way of example, a primary light source can be coupled into a fiber and a fiber coupling allows switching between a plurality of possible outputs where the light is coupled out of the fiber again. Each of these fiber outputs then acts like a secondary light source.

WO 2012/004016 A1 discloses a holographic display with an illumination device. The illumination device comprises one or two magnification units in the form of volume gratings aligned perpendicular to one another, which each expand the collimated light of at least one light source in one direction. A controllable light modulation device for representing a three-dimensional scene is provided upstream or downstream of the magnification unit or units. The magnification units facilitate the uniform illumination of a large light modulation device or the magnification of the area of the wave field of a small light modulation device.

WO 2010/149583 A1 discloses an illumination device and a light modulation apparatus having such an illumination device for illuminating a spatial light modulation device. The illumination device with a planar embodiment has a substrate, a waveguide, a coating layer and a final deflection layer in a sequence of layers. Polarized light from a light source is coupled into the waveguide laterally and propagates in planar fashion therein. The thickness of the coating layer is chosen in such a way that some of the evanescent wave field of the light passing through the waveguide is coupled out laterally. The coating layer can have a decreasing thickness in the propagation direction of the light in order to obtain a uniform distribution of the light fed to the light modulation device. The deflection layer can be designed as a volume grating.

US 2010/0289870 A1 discloses a display for the three-dimensional representation of a scene visible from a virtual observer window. The display comprises an illumination device with a light source, the light of which is guided in a light guide by way of total-internal reflection. To this end, the light guide comprises a core and cladding with a lower refractive index than the core. The refractive index of the cladding can be locally altered in such a way that it substantially corresponds to that of the core such that light is coupled out of the light guide at these points. To this end, the cladding can be designed as a liquid crystal layer that is controllable by way of electrodes. In an alternative embodiment, the cladding may be formed from a first liquid with a lower refractive index in comparison with the light guide, in which droplets of a second liquid, which is not miscible with the first, are formed with a refractive index corresponding to that of the core. The position of the droplets can be shifted by way of a switchable electric field. They form movable out-coupling points for the light guided in the light guide. Both embodiment variants can form position-adjustable secondary light sources, the light of which is guided in collimated fashion onto a light modulator, in which the three-dimensional scene is encoded, by means of a lens arrangement. Suitable positioning of the secondary light sources with respect to the lens arrangement allows the light to track the virtual observer window which varies in terms of its position.

DE 10 2016 100793 A1 describes a method for encoding complex-valued signals of a computer-generated hologram in a phase-modulating spatial light modulator. Here, provision is made of using degrees of freedom of the hologram plane and of the reconstruction plane for optimizing the iteration method in respect of a fast convergence and the maximization of the diffraction efficiency in a signal window. In particular, provision is made for the amplitude values to be set to a constant value in the case of a Fourier transform from the hologram plane to an observer plane in which the signal window is located. This constant value is ascertained from the statistical distribution of the amplitude values. The constant value can be the same over the entire iteration or can be adapted during the iteration.

WO 2012/062681 A1 discloses an apparatus with a spatially controllable light modulation device, which has a controllable light deflection device in the beam path downstream of the light modulation device. A multiple image of the light modulation device composed of segments lying next to one another is generated by means of the controllable light deflection device. The size of a holographic scene visible to an observer is determined by the size of the multiple image and is a multiple of the size of the light modulation device.

DE 10 2012 100209 A1 discloses electrically switchable volume gratings. Such a volume grating can be designed as a PDLCG (polymer dispersed liquid crystal grating), the refractive index modulation of which can be varied by means of an applied voltage. An applied voltage renders possible the alignment of dispersed liquid crystals in the field of electrodes. Since the deflection of the liquid crystal dipoles in the PDLC of a few degrees is sufficient to attain a sufficient refractive index modulation, i.e., in order to switch from a diffraction efficiency of $\eta=1$ to $\eta=0$ and vice versa, these switchable volume gratings can be operated at a switching rate of more than 1 kHz. The use of liquid crystal allows working with voltages of the order of 10 V. NLOP (non-linear optical polymers) can also be used in the PDLCG instead of the liquid crystals. However, needing voltages in the greater than 10 V or even 100 V range should be expected here.

SUMMARY OF THE INVENTION

It is therefore an object of the invention to develop a method and an apparatus which facilitate the representation of three-dimensional scenes with a high contrast and a great brightness resolution.

The object of the invention is achieved by a method having the features as claimed in the claims.

According to the invention, provision is made of a method for the three-dimensional representation of scenes comprising an illumination device and at least one spatial light modulation device for modulating incident light. A hologram or overall hologram is encoded into the at least one spatial light modulation device and the hologram or overall hologram is composed of individual sub-holograms, into which an object point of an object of a scene to be reconstructed by the hologram or overall hologram is encoded in each case. The at least one spatial light modulation device is illuminated with substantially coherent light by means of the illumination device in at least one illumination section. An amplitude distribution and a phase distribution for representing the scene and amplitude values and phase values derived therefrom for encoding the at least one the spatial light modulation device are determined. The amplitude of the light incident on the at least one spatial light modulation device is set in the respective illumination section on the basis of at least one parameter at least determined from the amplitude values in this illumination section.

The amplitude distributions and phase distributions correspond to the planar distributions of the amplitude values and phase values which the light leaving the at least one spatial light modulation device has followed the passage through the pixels of the spatial light modulation device. The amplitude values and the phase values are set by suitable control of the pixels of the spatial light modulation device by means of control signals, which are obtained by the encoding and which take account of the amplitude of the light incident on the spatial light modulation device. An illumination section can extend over the entire area of the spatial light modulation device. The spatial light modulation device can however also be illuminated by a plurality of illumination sections arranged next to one another.

Three-dimensional scenes with stills or moving images can have brightness values that are locally very different or that differ greatly over time. At the same time, object points in the scene can be arranged close to the spatial light modulation device or further away from the spatial light modulation device. When reproducing a three-dimensional scene in such a way that the latter is visible from a virtual observer window, a sub-hologram arises on the spatial light modulation device for each object point. In this case, object points located close to the spatial light modulation device form small sub-holograms with a comparatively small number of pixels and object points located further away from the spatial light modulation device form large sub-holograms with a comparatively large number of pixels. When reconstructing object points of the same brightness, the small sub-hologram must have substantially higher amplitude values on average than the large sub-hologram. By superposing the sub-holograms, the hologram to be written on the spatial light modulation device is formed with its amplitude distribution and phase distribution. A high object point density leads to many superpositions of sub-holograms. Accordingly, higher amplitude values are required in regions where many sub-holograms superpose than in regions with few superpositions of sub-holograms. Accordingly, the density of the object points in a certain region is also incorporated in the required amplitude values.

For these reasons, the amplitude distribution for reconstructing the three-dimensional scene can have very different amplitude values. If an intensity distribution has a dynamic range of 100:1, the associated amplitude distribution already has a dynamic range of 10 000:1. Such a high amplitude contrast cannot be reproduced by many known spatial light modulation devices.

Therefore, according to the invention, provision is made for the amplitude of the light incident on the spatial light modulation device within an illumination section to be adapted on the basis of the amplitude values required in the illumination section. By way of example, if low amplitude values are required in an illumination section, the amplitude of the light directed at the illumination section is reduced. In an illumination section that envisages high amplitude values, the amplitude of the incident light is increased up to the maximum brightness provided by the illumination device. In this way, the contrast of the three-dimensional representation can be increased significantly above the control range of the amplitude modulation of the spatial light modulation device. Advantageously, this on average requires a lower illuminance for the spatial light modulation device than in the case of a conventional illumination with unchanging illuminance and hence usually maximum illuminance. This reduces the power requirements of the illumination device, which is advantageous for mobile applications in particular. In contrast to screens presenting in two dimensions, such as televisions or computer monitors, in which the brightness of the backlight is able to be set locally or over the whole area on the basis of the brightness or the brightness distribution of the pixels to be displayed, the method according to the invention also takes account of the spatial arrangement of the object points in addition to the brightness thereof. In this case, holographic apparatuses use sufficiently coherent and substantially collimated illumination in contrast to two-dimensional representations.

An illumination section can comprise the entire reproduction range on the spatial light modulation device, within which the amplitude of the incident light can be set for scenes, successive in time, in the form of global dimming. By way of example, this allows successive day scenes and night scenes to be represented with a high contrast. A plurality of illumination sections arranged adjacently to one another can likewise be used. In this case, these illumination sections can subdivide the reproduction region, for example in the form of a tiling, into, e.g., 2×2 or 3×4 sections, down to a fine subdivision taking account of individual object points. This facilitates a so-called local dimming, i.e., the local adaptation of the amplitude of the light incident on the spatial light modulation device. In such an embodiment, the amplitude of the light incident on the spatial light modulation device can be adapted within a locally restricted illumination section to the amplitude distribution present there. Hence, a significant improvement of the reproduction of brightness differences is achieved within a single scene. The improved contrast ratio of scenes successive in time is maintained in this case.

Of the amplitude distribution and the phase distribution for representing the scene, only the amplitude distribution, and not the phase distribution, is used to set the amplitude of the light incident on the spatial light modulation device. That is to say, in the case where the spatial light modulation device is designed as a sandwich made of amplitude modulator and phase modulator, the phase values written into the spatial light modulation device remain largely untouched by the method according to the invention. In other cases, for example when using macro pixels in a phase modulator, the derived phase values for encoding the spatial light modulation device may naturally also depend on the setting of the amplitude of the light incident on the spatial light modulation device.

Further advantageous configurations and developments arise from the dependent claims.

In an advantageous configuration of the invention, it can be provided that a virtual observer window in an observer plane is provided, a noise window being assigned to said observer window, where the at least one spatial light modulation device comprises a phase-modulating light modulator, where control signals for controlling the at least one spatial light modulation device are determined in an iterative method, where the amplitude of the light incident on the at least one spatial light modulation device in the respective illumination section is set on the basis of the at least one parameter.

Consequently, a noise window is assigned to the virtual observer window, where coherent light of the illumination device is fed in one or more illumination sections to a phase-modulating spatial light modulation device, which consequently forms a hologram plane. Control signals for controlling the spatial light modulation device are determined in an iteration method. The amplitude of the light incident on the spatial light modulation device is set in the respective illumination section on the basis of at least the parameter.

Advantageously, it can be provided that the complex values of a light wave field are assigned to the virtual observer window and the noise window, where a complex target value distribution of the light wave field in the virtual observer window is determined from the scene, where the complex values in the observer plane are transformed into a hologram plane by means of an inverse transformation in an iteration step, where the absolute values of the complex values in the hologram plane are set to a target absolute value for each illumination section, where the complex values obtained thus are transformed into the observer plane by means of a transformation and replaced by the complex target value distribution in the virtual observer window, where a parameter is determined in the hologram plane from the target absolute value in the respective illumination section present after a termination criterion of the iteration has been attained and/or from absolute values of the complex values in the respective illumination section after reaching a termination criterion of the iteration.

The target absolute value can be determined before the start of the iteration or after a first iteration step, for example from the absolute values of the complex values in the hologram plane present, for example as a mean value of the absolute values of these complex values.

The target absolute value can optionally be kept constant during the iteration or be adapted after each iteration step. By way of example, in the latter case, the target absolute value can be recalculated in each iteration step after the inverse transformation into the hologram plane as the mean value of the absolute values of the complex values in the respective illumination section.

In the case of multi-phase encoding, a plurality of pixels of the spatial light modulation device are combined to form a macro pixel, where a macro pixel in each case represents a complex value in the hologram written on the spatial light modulation device. In the case of the previously known iteration methods, the absolute values of the complex values are set to a target absolute value provided over the whole area of the spatial light modulation device during the back transformation. A condition for the phase encoding is that all absolute values of the complex values are constant at the end of the iteration. Such a method is known from Gerchberg & Saxton (R. W Gerchberg and W. O. Saxton, Optik 35, 237 (1972)).

If the calculation in the hologram plane is terminated after a restricted number of iteration steps to save computation time, there still are residual amplitude variations in the values for individual pixels to be written in. Therefore, it is not the case that all amplitudes are constant, as required for phase encoding. It was found here that the amplitudes that are too large or too small are not distributed stochastically in the hologram but correlate with certain sections of the three-dimensional scene on the basis of, for example, the brightness of the object points, the distance thereof from the spatial light modulation device and/or the density of the object points.

By setting the amplitude of the light incident on the spatial light modulation device in the one or more illumination section(s) on the basis of the utilized target absolute value or on the absolute values of the complex values actually present, it is possible to at least partly correct this aberration. Consequently, fewer iteration steps are required for sufficiently accurately representing a three-dimensional scene by means of multi-phase encoding. Advantageously, this can significantly reduce the computation time for determining the encoding of the spatial light modulation device and for representing the three-dimensional scene. At the same time, the brightness levels of adjacent illumination sections are matched to one another.

A brighter reproduction of the three-dimensional scene can be attained as a result of the smaller number of iteration steps. Although additional iteration steps improve the relative brightness and fineness of the brightness gradations, they could also lead to a darker reconstruction. This is because light can be deflected to or directed at the noise window from sub-holograms with a low amplitude, but additional light cannot be deflected to or directed at the virtual observer window from sub-holograms with a high amplitude.

Advantageously, the parameter can be set to equal the target absolute value in the respective illumination section when a termination criterion of the iteration is attained. The parameter can be set before the start of iteration. The target absolute value in the respective illumination section can be set to equal the parameter and remains the same for all iteration steps. Or the parameter can be set after the termination criterion of iteration has been attained and the target absolute value can be adapted in each iteration step.

A good reproduction of both the brightness and the brightness distribution of a reconstructed object of a scene can be attained by virtue of the parameter being determined from average values of the absolute values of the complex values, present after a termination criterion of iteration has been reached, in the respective illumination section in the hologram plane.

According to a preferred configuration of the method according to the invention, it can be provided that for the target absolute value in the respective illumination section is determined before the start of the iteration or after a first iteration step from the absolute values of the complex values present in the hologram plane and/or that the target absolute value in the respective illumination section is determined on the basis of the brightness of the object points to be reconstructed and/or on the basis of parameters of sub-holograms, in particular the position of object points to be represented relative to the relative position of the at least one spatial light modulation device and/or the density of object points.

Fast convergence of the iteration is achieved by way of a suitable choice of the target absolute value. At the same time, the object to be reconstructed can be represented with the desired brightness. Determining the target absolute value from the absolute values of the complex values is easy to implement after at least one first iteration step, for example within a computing program. However, suitable target absolute values can also be determined directly from the object point to be reconstructed, for example from its brightness, brightness distribution and/or position in relation to the spatial light modulation device. Then, a suitable target absolute value is advantageously available already before the iteration starts, yielding an even more shortened iteration method.

By setting the amplitude of the light incident on the spatial light modulation device, residual amplitude variations, as may arise after a premature termination of the iteration, are compensated. If the residual amplitude variations are very large, the adjustment range within which the amplitude of the light incident on the spatial light modulation device can be set may not be sufficient to sufficiently compensate the residual amplitude variations. Therefore, provision can be made for one or more additional iteration steps to be carried out after a termination criterion of the iteration has been reached if an adjustment range of the amplitude of the light incident on the spatial light modulation device is exceeded. As a result of the additional iteration, the residual amplitude variations are reduced until the adjustment range of the amplitude of the light incident on the spatial light modulation device is sufficient.

According to a further preferred configuration of the invention, it can be provided that the at least one spatial light modulation device comprises an amplitude modulating light modulator, where control signals for controlling the at least one spatial light modulation device are determined, where the control signals serve to set the amplitude values on the basis of at least the parameter and the amplitude values. These control signals which serve to set the derived amplitude values for encoding and which are to be written into the at least one spatial light modulation device are determined on the basis of at least the parameter and the amplitude distribution for representing the scene.

The required amplitude distribution for representing the scene and hence the required derived amplitude values for the encoding arise from the three-dimensional scene to be represented. If the amplitude distribution requires amplitude values down to a fraction of a possible maximum value for the purposes of representing the scene in an illumination section, and hence requires greatly reduced amplitude values, the parameter may be set to this fraction, for example, and the amplitude of the light fed to the spatial light modulation device in the respective illumination section can be set accordingly. In order to obtain the originally calculated amplitude distribution of the scene in the case of such a reduced amplitude of the light fed to the spatial light modulation device in the respective illumination section, the control signals can be formed on the basis of the parameter, for example from the product of the amplitude values and the inverse of the parameter. As a result, substantially the entire range of the control signals representable on the spatial light modulation device is utilized. By way of example, a spatial light modulation device is controlled by control signals with a resolution of 8 bits in the range from 0 to 255. Here, for example, the maximum amplitude is reproduced by the control signal 255 and the minimum amplitude is reproduced by the control signal 0. In the case of an exemplary amplitude distribution in which only half of the maximum possible amplitude values occur in the considered illumination section, only values between 0 and 127 are used as control signals. According to the invention, it is now possible, for example, to halve the amplitude of the light fed to the spatial light modulation device and in exchange double the control signals. As a result, the full scope and the full resolution of the control signals are utilized for the amplitudes on the spatial light modulation device and the reproduction of brightness gradations of the three-dimensional scene is improved. The improvement becomes even clearer in the case of a scene in which only $\frac{1}{10}$ of the possible amplitude values occur in the illumination section. In the conventional procedure according to the prior art, only 25 different amplitude values are then available on the spatial light modulation device. This may lead to it no longer being possible to represent fine brightness gradations. However, according to the method according to the invention, it is possible to represent 256 different amplitude values and hence also possible to reproduce fine brightness gradations. In embodiments of the invention, the parameter can also be derived from a different value to the maximum amplitude in the illumination section, for example from the median or the average of amplitudes or else from a fraction of the maximum value, for example 95% or 90%, or else from (maximum value−minimum value)/2. Likewise, a different functional relationship to multiplication by the inverse of the parameter value can be used for determining the control signals, for example 1/square root of the parameter value or square of the parameter value. What is essential is that adapting the amplitude of the light incident on the spatial light modulation device allows the entire adjustment range of the control signals for setting the amplitude values of the spatial light modulation device to be utilized in order to set the amplitude distribution required to reconstruct the object point.

Preferably, collimated light can be fed to the spatial light modulation device. As a result, a reconstruction of the three-dimensional scene that is visible from the virtual observer window or windows can be generated by the hologram written on the spatial light modulation device.

A suitable adaptation of the amplitude of the light fed to the spatial light modulation device and/or a suitable adaptation of the control signals for setting the amplitude values can be achieved by virtue of the parameter being determined from the ratio of the maximum amplitude value in the respective illumination section to the maximum possible amplitude value on the at least one spatial light modulation device. The scope of amplitude values representable by the at least one spatial light modulation device and the resolution of representable amplitude values are optimally utilized in this way.

According to a particularly advantageous embodiment of the method according to the invention, it can be provided that the parameter is determined on the basis of the brightness of the object points to be reconstructed and/or on the basis of parameters of the sub-holograms, in particular the position of object points to be represented relative to the relative position of the at least one spatial light modulation device and/or the density of object points.

The amplitude of the light fed to the at least one spatial light modulation device and/or the adaptation of the control signals is consequently set on the basis of the brightness of the object points to be reconstructed, the position of the object points in relation to the spatial light modulation device and hence the size of the respectively required sub-hologram and/or the density of the object points and hence the superpositions of the sub-holograms on the spatial light modulation device. Brighter object points require a greater amplitude of the incident light than darker object points at the same distance from the spatial light modulation device. Object points close to the spatial light modulation device have smaller sub-holograms than object points situated further away from the spatial light modulation device. If two such object points should be represented with the same brightness, the picture elements or pixels of the comparatively small sub-hologram must be represented with a substantially higher amplitude. The amplitude of a sub-hologram required to reconstruct an object point with a certain intensity is approximately proportional to the square root of the number of pixels in the sub-hologram. Therefore, a 5×5 pixel sub-hologram must have an amplitude higher by a factor of 20 than a 100×100 pixel sub-hologram in order to reconstruct an object point with the same brightness. The superposition of sub-holograms likewise leads to higher required amplitudes of the light fed to the spatial light modulation device. By way of example, it is therefore possible to determine a parameter from the ratio of the maximum to minimum sub-hologram size in the respective illumination section or from the product of the number of scene points with a certain sub-hologram size and this size, summed over all sub-hologram sizes occurring in the respective illumination section. By taking account of these relationships when choosing the amplitude of the light fed to the spatial light modulation device and the spread of the control signals, it is possible to attain a high contrast ratio and a fine gradation of the brightness of the represented scene.

According to the invention, to set the amplitudes in different illumination sections, it can advantageously be provided that the illumination device comprises at least one light source or else a plurality of light sources, where an illumination section is illuminated by the at least one light source and where the at least one light source assigned to an illumination section is set in terms of its amplitude in accordance with the parameter determined for the illumination section, or that the illumination device comprises at least one light source, where at least one secondary light source is generated by the light of the at least one light source, where an illumination section is illuminated by the at least one secondary light source and where the at least one secondary light source assigned to an illumination section is set in terms of its amplitude in accordance with the parameter determined for the illumination section.

The at least one spatial light modulation device can thus be illuminated with different illuminance levels in different regions. The illuminance can be set by directly controlling the at least one light source. By way of example, the voltage value or the current can be varied to control a light source. The contrast within a scene can be significantly improved by controlling the light source.

The contrast within a scene can also be improved if the illumination device has at least one light source, where at least one secondary light source is formed by the light of the at least one light source, where an illumination section is illuminated by the secondary light source or light sources and where the secondary light source or secondary light sources assigned to the illumination section are set in terms of their amplitude in accordance with the parameter determined for the illumination section. In this case, too, the different illumination sections can be illuminated by light with different amplitudes such that, for example within a scene, an object region with bright object points arranged close to the light modulation device and an object region with dark object points arranged far away from the at least one spatial light modulation device can be represented with the desired brightness ratio.

The amplitudes of secondary light sources are set in accordance with the type of secondary light source and, accordingly, in accordance with how the secondary light source is formed by the primary light source. This will be described in more detail in the exemplary embodiments.

Accurate and fast setting of the amplitude of the light fed to the spatial light modulation device can be implemented by virtue of the illumination device comprising at least one light source, wherein the light of the at least one light source is fed via at least one switchable optical element to the at least one spatial light modulation device and where the amplitude of the light fed to an illumination section is set using the at least one switchable optical element on the basis of the parameter determined for the illumination section. By way of example, such a switchable optical element can be designed as an arrangement of switchable optical openings (shutter arrangement), as a controllable volume grating, as an extensive light guide with controllable out-coupling points or else as an optical switch with liquid crystals.

In a further advantageous configuration of the invention, it can be provided that the amplitude of the light fed to an illumination section is set continuously or discontinuously on the basis of the parameter determined for the illumination section or that an amplitude averaged over a time interval is set on the basis of the parameter by pulse width modulation.

That is to say, in the case of pulsed light sources, the amplitude averaged over a time interval is set over a pulse duration within which the light source is switched on, where the time interval for averaging corresponds to a frame of an SLM control, for example.

A continuous adjustment facilitates finely resolved settings of the amplitude of the light fed to the spatial light modulation device. A discontinuous adjustment is easily implementable, for example in digital fashion. The pulse width modulation only requires two switching states (on and off). Linearity deviations between the amplitude of the light fed to the spatial light modulation device and the control signals, provided to this end for controlling the light source, as may occur in the case of a brightness control of the primary or secondary light source for example, are avoided in the case of pulse width modulation. To set the amplitude, optical openings of a shutter arrangement or out-coupling points of a light guide can be variably adjustable in terms of their transmission, for example. In the case of pulse width modulation, the openings of the shutter arrangement are opened and closed for a respectively adjustable duration. The average transmission over time arises from the ratio of the open duration to the sum of open duration and closed duration.

According to a further configuration of the invention, it can be provided that the at least one spatial light modulation device is illuminated by at least two light sources with respectively assigned imaging elements, e.g., lens elements, where each light source illuminates an illumination section of the at least one spatial light modulation device and where the amplitude of the light of the light source assigned to the respective illumination section is set in accordance with the parameter. The light source provided for each imaging element is set in terms of its brightness in accordance with the hologram content such that the amplitude provided for the respective illumination section in accordance with the parameter is present. The illumination sections can be embodied adapted in size and shape to the respective requirements. By way of example, a different maximum sub-hologram size may arise depending on the field of use of the at least one spatial light modulation device and parameters such as the pixel pitch of the spatial light modulation device, for example. By way of example, an illumination section can be chosen in such a way that it corresponds to this maximum sub-hologram size or a certain percentage of this size, for example 80%. Another example for the requirements when representing three-dimensional scenes may arise from certain content which make up the scenes. By way of example, if the represented scenes are made up of individual elements that have a certain typical maximum size, for example if the scene consists of symbols of a certain size, then an illumination section can also be chosen in such a way that it corresponds to this symbol size. Depending on requirements, the spatial light modulation device can be separately illuminated in a suitable number of suitably dimensioned illumination sections, as a result of which the desired high contrast corresponding to a demanded resolution can be attained.

Further, in a special embodiment, the invention can be designed in such a way that the at least one spatial light modulation device is illuminated by at least one light source, where a shutter arrangement with portions that are continuously or discontinuously adjustable in terms of their transparency is arranged between the at least one light source and the at least one spatial light modulation device, where imaging elements are assigned to the adjustable portions of the shutter arrangement, where each imaging element directs light to a separate illumination section of the at least one spatial light modulation device and where the amplitude of the light fed to the at least one spatial light modulation device in the respective illumination section is set in accordance with the parameter by controlling the adjustable portions of the shutter arrangement in respect of transparency or, averaged over a time interval, by pulse width modulation.

Thus, the amplitude of the light fed to the at least one spatial light modulation device can be set in steps, continuously, or by way of pulse width modulation. In this case, the size and the shape of the illumination sections assigned to a spatial light modulation device can be adapted to the respective requirements. Thus, provision can be made of many small illumination sections with the size of a portion, in which illumination sections the amplitude of the light fed to the spatial light modulation device is suitably set in each case. The brightness of the representation within a scene can thus be set in optimized fashion in many portions. Relatively large illumination sections, which each comprise a plurality of adjustable portions, can be controlled more easily.

To generate a plurality of amplitude controllable light sources, a further possible embodiment of the invention can provide for the illumination device to comprise a hologram device which is designed to be controllable and in which a diffractive optical function is written in such a way that at least one primary light source is imaged or transformed into at least two secondary light sources by way of the writable diffractive optical function, where the at least two secondary light sources each illuminate illumination sections of the at least one spatial light modulation device and where the amplitude of the secondary light sources is set by controlling the hologram device and/or by changing the amplitude of the at least one primary light source or at least one light source of an arrangement of at least two primary light sources on the basis of the parameter determined for the respective illumination section.

The arrangement of the at least two secondary light sources can be one-dimensional, two-dimensional (at least three light sources) or three-dimensional (at least four light sources). The incident light is redistributed in such a way by means of the controllable hologram device that no light is absorbed. This is therefore an embodiment with particularly low power requirements, as may be advantageous for portable devices, for example.

Further, provision can be advantageously made for the at least one spatial light modulation device to be illuminated by at least one light guide with discontinuities for out-coupling of light, where light from at least one primary light source is coupled into the light guide, where the discontinuities form secondary light sources, which each illuminate illumination sections of the at least one spatial light modulation device, and where the amplitude of the secondary light sources is set by changing the out-coupling efficiency of the discontinuities and/or by changing the amplitude of the at least one primary light source or at least one light source of an arrangement of at least two primary light sources on the basis of the parameter determined for the respective illumination section. The light guide can have a planar embodiment or else an embodiment which is curved at least in sections. A particularly flat structure of the apparatus can be attained by means of a planar embodiment of the light guide of the invention.

Discontinuities of a light guide that are adjustable in terms of their out-coupling efficiency can be implemented by virtue of the at least one spatial light modulation device being illuminated by at least one light guide which has a cladding with a locally changeable refractive index for the purposes of forming discontinuities, where the refractive index, and hence the amplitude of the light coupled out of the light guide, is set locally on the basis of the parameter of the illumination section illuminated by the out-coupled light.

In this embodiment of the invention, the light previously coupled into the light guide can be redistributed between individual discontinuities that form secondary light sources such that this embodiment can be designed in particularly energy-saving fashion.

A large-area illumination for at least one spatial light modulation device can advantageously be implemented by virtue of light of at least one light source being fed to at least one enlargement device with at least one grating element.

Here, according to the invention, provision can be made for the light from the at least one enlargement device to be fed to the at least one spatial light modulation device and where the amplitude of the light fed to an illumination section of the at least one spatial light modulation device is set on the basis of the parameter determined for the illumination section by adapting the amplitude of the light emitted by the at least one light source or at least one light source of an arrangement of at least two light sources and/or by adapting a beam splitter provided in the light path between at least one light source and at least one enlargement device and/or by a local or whole-area adaptation of the transparency of an amplitude modulator provided in the light path between at least one light source and at least one enlargement device and/or by a local or whole-area change of the light out-coupling of the at least one grating element.

By way of example, the method according to the invention can be used in an arrangement of a plurality of enlargement devices arranged next to one another in one dimension or two dimensions in the style of a tiling arrangement by virtue of each enlargement device illuminating an illumination section of the at least one spatial light modulation device and by virtue of, for each enlargement device, the assigned light source being able to be set in terms of its amplitude. If some or all of the enlargement devices arranged in a tiling arrangement are impinged by light from a single light source by way of a beam splitter, the amplitude or the intensity of the light source and/or the splitting ratio of the beam splitter can be adjusted in accordance with the parameter for the respective illumination section. If the beam splitters are polarization beam splitters, the division of the light intensity from the light source by the beam splitters into the enlargement devices can be implemented by one or more polarization switches, which are arranged in the light path between the light source and the respective beam splitters.

An illumination device which is adjustable in terms of its amplitude over a large area and which serves for at least one spatial light modulation device can advantageously be attained by virtue of the at least one spatial light modulation device being illuminated by an illumination device comprising at least one light guide comprising a core layer and a coating layer which is arranged on the core layer and which tapers off along the propagation direction of the light or a coating layer with a changing or controllable refractive index along the propagation direction of the light, where light of at least one light source is coupled into the light guide and said light propagates in extensive fashion in the light guide, where the light guide comprises a deflection layer provided on the coating layer, said deflection layer out-coupling and deflecting the evanescent wave field of the light propagating in the light guide, and where the amplitude of the light illuminating an illumination section is set by sectional changes in the out-coupling efficiency of the deflection layer and/or the out-coupling efficiency of the coating layer and/or by changing the amplitude of light emitted by the at least one light source or at least one light source of an arrangement of at least two light sources on the basis of the parameter determined for the respective illumination section. The coating layer that tapers in the propagation direction of the light, consequently being a coating layer with a wedge-shaped embodiment, is preferably designed such that the intensity and amplitude of the out-coupled light can be kept constant. By locally changing the out-coupling efficiencies of coating layer and/or deflection layer, it is possible to out-couple a component of the evanescent wave field that is selectable in accordance with the parameter and feed this to the at least one spatial light modulation device. Light not output coupled from the light guide propagates onwards and can contribute to increasing the intensity at another site within the scope of a redistribution. As a result, the illumination device can have a particularly energy-saving design and can be particularly suitable for mobile devices.

In a preferred embodiment of the method according to the invention using an extensive light guide, provision can be made for the deflection layer to be formed by a grating element, in particular by a volume grating, where the amplitude of the light illuminating an illumination section is set by local or whole-area change in the light out-coupling of the grating element, and/or for the coating layer to be formed by a liquid crystal layer, where the amplitude of the light illuminating an illumination section is set by local or whole-area change in the refractive index of the liquid crystal layer.

In this way, it is possible to provide illumination devices with a very flat embodiment, as a result of which a compact structure of a holographic display apparatus using the method according to the invention arises. Advantageously, 10 mm×10 mm to 20 mm×20 mm large regions can be combined in each case to form an illumination section.

For a particularly simple and compact application in an apparatus with a large field of view, provision can be made, in a further advantageous embodiment of the method according to the invention, for the at least one spatial light modulation device to generate images, i.e., image arranged in a plane next to one another or at different depths, i.e., in succession, where, for each of the images, the amplitude of the light incident on the at least one spatial light modulation device is set in the respective illumination section on the basis of at least one parameter determined from the amplitude values in this illumination section and where the control signals, which are to be written into the at least one spatial light modulation device, for setting the amplitude are determined from amplitude values adapted by the parameter.

The field of view of the three-dimensional scene is increased by generating images lying next to one another. By generating images at different depths, it is also possible to decompose the three-dimensional scene into different depth sections and illumination sections are assigned to these different depth sections of the three-dimensional scene. Since the sub-hologram size increases with the distance from the image of the at least one spatial light modulation device, subdividing the three-dimensional scene into depth sections allows the range of different sub-hologram sizes within a depth section to be reduced. As a result, it is already possible to reduce the scope of the amplitude distribution within a single depth section. Additionally, the amplitude of the light source can be set in accordance with the determined parameter.

At least one spatial light modulation device is used, by means of which images are generated next to one another or at different depths by means of a controllable light deflection device such that it is possible to generate an image of the at least one spatial light modulation device for the purposes of reconstructing a scene, which image is enlarged in relation to the at least one spatial light modulation device. In one embodiment, it is possible to set an amplitude of the fed light determined on an individual basis from the parameter for each of the images. In this case, an illumination section can correspond to a single image of the at least one spatial light modulation apparatus. Alternatively, illumination sections can be chosen in such a way that they are smaller than a single image by virtue of sections of the at least one spatial light modulation device being illuminated by at least one primary or at least two secondary light sources. This allows different settings of amplitude of the at least one light source for the individual images to be combined with different settings of amplitude in accordance with the respective parameter in illumination sections within an image. The method is advantageously suitable, in particular, for improving the reproduction of brightness gradations in a head-mounted display.

In certain cases, an encoding method is applied for the at least one spatial light modulation device, within the scope of which two or more pixels are used for representing a complex value, in which therefore at least two derived amplitude values and/or phase values are also used for encoding a complex value from the amplitude distribution and phase distribution for the purposes of representing the scene. At least two phase values are used to encode a complex value in the case of multiphase encoding.

Advantageously, in the case of at least one spatial light modulation device with multiphase encoding, provision can be made for the control signals to be written into the at least one spatial light modulation device for setting phase values of individual pixels of the at least one spatial light modulation device to be determined on the basis of at least the parameter and the amplitude distribution for representing the scene.

In the case of multiphase encoding, a plurality of pixels of the at least one spatial light modulation device are combined to form a macro pixel, for example by means of a so-called beam combiner or by a phase sandwich consisting of two successive phase modulators. A macro pixel in each case represents a complex value in the hologram written or encoded on the at least one spatial light modulation device. Consequently, the smallest possible illumination section on the at least one spatial light modulation device has the size of a macro pixel. Accordingly, relatively large illumination sections comprise many macro pixels. By way of example, a complex number is expressed by two pixels with an absolute value of 1 and different phases in the case of two-phase encoding. For a maximum amplitude value, the phases generated by the combined pixels are the same in each case. The two phases differ by $\pi$ for an amplitude value of zero. Amplitude values lying therebetween are attained by corresponding phase differences between the pixels. By way of example, a phase difference of $\pi/4$ is required to obtain an amplitude value of, e.g., 0.707. If amplitude values between 0 and 0.707 only were present in the amplitude distribution for representing the scene, the phase differences between $\pi/4$ and $\pi$, and consequently a range of $3\pi/4$, would be used in the derived phase values for the encoding.

By way of example, if the intensity of the illumination of the at least one spatial light modulation device is halved according to the invention, i.e., if the amplitude of the light source is reduced to the factor of 0.707, then a phase difference of zero should be provided to attain the amplitude value of 0.707 on account of the quadratic dependence of the intensity on the amplitude. Consequently, phase differences between 0 and $\pi$ can be used to represent amplitude values between 0 and 0.707 by derived phase values for the encoding. Consequently, a greater phase range is available. Consequently, the representable brightness gradations can advantageously have finer embodiment in the case of pure phase encoding and a reduced amplitude of the light fed to the at least one spatial light modulation device.

Further, provision can moreover be made for the amplitude of the light incident on the at least one spatial light modulation device to be set in each case in an illumination section which comprises one or more pixels of the spatial light modulation device or a plurality of pixels combined into a macro pixel for multiphase encoding or a plurality of macro pixels or a 5 mm×5 mm to 50 mm×50 mm region, preferably a 10 mm×10 mm to 20 mm×20 mm region.

The size of the illumination sections on the at least one spatial light modulation device can thus be ideally adapted to the requirements in respect of the brightness differences of an object point to be represented, but also to the utilized illumination device, the spatial light modulation device and the utilized encoding method for writing or encoding a hologram into the spatial light modulation device.

When using at least two derived amplitude values for the encoding for representing a complex value from the amplitude distribution and phase distribution for representing the scene, for example in the case of a Burkhard encoding, a parameter can also be ascertained from the derived amplitude values and not from amplitude distribution itself.

The present object of the invention is further achieved by a holographic display apparatus having the features of the claims.

According to the invention, a holographic display apparatus for the three-dimensional representation of scenes comprises an illumination device, at least one spatial light modulation device for modulating incident light and a computing device. A hologram is encoded into the at least one spatial light modulation device and the hologram is composed of individual sub-holograms, in which an object point of an object of a scene to be reconstructed by the hologram is encoded in each case. The at least one spatial light modulation device is able to be illuminated with substantially coherent light by the illumination device in at least one illumination section. The computing device is designed to determine an amplitude distribution and a phase distribution for representing the three-dimensional scene and amplitude values and phase values derived therefrom for encoding the at least one spatial light modulation device. The illumination device is designed to set the amplitude of the light incident on the at least one spatial light modulation device in the respective illumination section on the basis of at least one parameter determined from the amplitude values in this illumination section.

By setting the amplitude of the light incident on an illumination section, it is possible to set the amplitude values over the adjustment range which is facilitated by the at least one spatial light modulation device. As a result, it is possible to significantly improve the contrast within a scene or between two successive scenes. In this way, the holographic display apparatus facilitates a faithful representation of three-dimensional scenes. In addition to the brightness of the represented object points of the scene, the spatial arrangement thereof in relation to the at least one spatial light modulation device and in relation to one another is also taken into account here such that, for example, it is also possible to represent object points far away from the at least one spatial light modulation device and object points arranged close to the at least one spatial light modulation device with the desired brightness ratio to one another. The invention easily solves the problem that known spatial light modulation devices are unable to represent three-dimensional scenes with a contrast corresponding to the original, and hence a desired contrast, on account of their restricted adjustment ranges for the amplitude.

In an advantageous configuration of the invention, provision can be made for provision to be made of at least one virtual observer window in an observer plane, a noise window being assigned to said observer window, where the at least one spatial light modulation device comprises a phase modulating light modulator, where substantially coherent light is able to be supplied by means of the illumination device into at least one illumination section on the at least one spatial light modulation device, where the computing device is designed to determine control signals for controlling the at least one spatial light modulation device by means of an iteration method, and where the illumination device is designed to set the amplitude of the light incident on the at least one spatial light modulation device in the respective illumination section on the basis of at least the parameter.

Here, provision can advantageously be made for complex values of a light wave field in the observer plane to be assigned to the virtual observer window and the noise window, where a complex target value distribution of the light wave field in the virtual observer window is able to be determined from the three-dimensional scene, where the complex values in the observer plane are able to be transformed into a hologram plane by means of an inverse transformation in an iteration step, where the absolute values of the complex values in the hologram plane are set to a target absolute value for each illumination section, where the complex values ascertained thus are transformed into the observer plane by means of a transformation and replaced by the complex target value distribution in the virtual observer window, where a parameter is able to be determined in the hologram plane from the target absolute value in the illumination section present after a termination criterion of the iteration has been attained and/or from absolute values of the complex values in the illumination section after reaching a termination criterion of the iteration.

By way of example, the parameter equals the target absolute value in the respective illumination section and the amplitude of the incident light is set directly proportional to this target absolute value.

In other words, the parameter can be set before the start of iteration. The target absolute value in the respective illumination section can be set to equal the parameter and remain the same for all iteration steps. The parameter can be set after the termination criterion of the iteration has been attained and the target absolute value can be adapted in each iteration step.

The holographic display apparatus facilitates the representation of three-dimensional scenes with a high contrast, both within a scene and in successive scenes. In this case, the at least one spatial light modulation device can have a phase modulating light modulator.

An iteration method is usually very time-consuming and so representations in real time are only possible to a limited extent. As a result of the holographic display apparatus according to the invention, it is possible to generate high-contrast and faithful reconstructions of three-dimensional scenes in significantly fewer iteration steps and hence in real time.

If an iteration is terminated after a restricted number of iteration steps in the hologram plane, residual absolute value variations of the values to be written for the individual pixels of the at least one spatial light modulation device usually still remain there. Therefore, it is not the case that all absolute values of the complex values are constant as needed for phase encoding. The absolute values that are too large or too small are not distributed stochastically in the hologram but correlate with certain sections of the three-dimensional scene. Here, the absolute values are dependent on the brightness of the objects to be represented and hence object points, and also the spatial arrangement thereof.

The holographic display apparatus according to the invention now renders it possible to provide different target absolute values for different illumination sections of the at least one spatial light modulation device and hence of the hologram during the iterative calculation. By way of example, the same target absolute values can be set for all illumination sections in the first iteration step. After preferably the first iteration step, suitable target absolute values are determined and used for the further iteration in the respective illumination sections from the absolute values of the complex values for each illumination section, for example by way of respective averaging. By suitably adapting the amplitude of the light fed to a respective illumination section to the target absolute value, a reconstruction with only a few errors, should errors even be present, is facilitated. Here, the amplitude is adapted by the appropriately embodied illumination device.

The reconstruction of a three-dimensional scene with few or no errors after a few iteration steps is also attained if the amplitude of the light fed to the illumination section or sections is set on the basis of the absolute values of the complex values after termination of the iteration. By way of example, the parameter can be determined as the mean value of the absolute values in the respective illumination section and can be used to set the amplitude of the light incident on the illumination section.

Preferably, provision can be made for the light fed to the at least one spatial light modulation device to be collimated.

An illumination of the at least one spatial light modulation device with the amplitude of the incident light in the respective illumination section on the basis of at least one parameter determined from the amplitude values in this illumination section can advantageously be attained by virtue of at least one switchable optical element that is adjustable in terms of its transparency over the whole area or in sections on the basis of the parameter determined for the illumination section being arranged upstream of the at least one spatial light modulation device in the light direction.

By way of example, the at least one switchable optical element can be designed as an amplitude modulated light modulator, as a shutter element or as a liquid crystal element. In this case, the shutter element should preferably be designed in such a way that it can also set grayscale values. If the transparency can be set over the entire area, a switchable optical element is preferably assigned to each illumination section. If the transparency can be set in sections, a switchable optical element can be assigned to a plurality of illumination sections.

In an advantageous configuration of the invention, provision can be made for the illumination device to comprise at least one light source with an assigned imaging element, where an illumination section of the at least one spatial light modulation device is illuminable by means of the at least one light source, where the amplitude of the light emitted by the at least one light source is adjustable in accordance with the parameter, or for an amplitude of the light emitted by the at least one light source, averaged over a time interval, to be adjustable in accordance with the parameter by way of pulse width modulation.

The illumination device thus facilitates setting of the amplitudes of the light fed to the respective illumination sections. In this case, the amplitude is set by controlling one or more light sources in accordance with the parameter. Both continuous setting of the amplitude, for example by control values of the current or the voltage, and setting by means of pulse width modulation are implementable using simple means. To ascertain the parameter, it is possible to relate the maximum amplitude in the illumination section upstream of the respective imaging element, for example a lens element, to the maximum amplitude of all pixels in the hologram. In this case, it is also possible to determine the factor for spread of the control signals to be written to the at least one spatial light modulation device for the purposes of setting the amplitudes.

Further, according to the invention, provision can be made for the at least one spatial light modulation device to be illuminable by at least one light source, where a shutter arrangement with portions that are continuously or discontinuously adjustable in terms of their transparency is arranged between the at least one light source and the at least one spatial light modulation device, where imaging elements, for example lens elements, are assigned to the adjustable portions of the shutter arrangement, where by means of each imaging element, light is directable to a separate illumination section of the at least one spatial light modulation device and where the amplitude of the light fed to the at least one spatial light modulation device in the respective illumination section is able to be set in accordance with the parameter by controlling the adjustable portions of the shutter arrangement in respect of transparency or by pulse width modulation.

Within the scope of pulse width modulation, the portions of the shutter arrangement are switched to a maximum transparency for a specifiable duration and to a minimum transparency for a further specifiable duration. The mean transparency arises from the ratio of the duration of the maximum transparency to the duration of an overall cycle of both durations. In another embodiment of the invention, the transparency can be set to a value lying between the minimum and maximum transparency. Both types of control allow the amplitude of the light incident on the at least one spatial light modulation device in an illumination section to be set exactly.

A very variably adjustable illumination of the at least one spatial light modulation device can advantageously be facilitated according to the invention if the illumination device comprises a hologram device which is designed to be controllable and in which a diffractive optical function is writable in such a way that a transformation or imaging of at least one primary light source into at least two secondary light sources is provided by way of the writable diffractive optical function, where illumination sections of the at least one spatial light modulation device are illuminable in each case by the at least two secondary light sources and where the amplitude of the light of the at least two secondary light sources is adjustable set by controlling the hologram device and/or by changing the amplitude of the at least one primary light source or at least one light source of an arrangement of at least two primary light sources on the basis of the parameter determined for the respective illumination section.

What is advantageous in terms of generating secondary light sources with a hologram device is that the amplitude of the secondary light sources can be set by recoding the hologram device, i.e., writing an altered optical function. In this case, the light of the at least one primary light source is redistributed such that no absorption losses arise. Therefore, the embodiment is particularly energy-saving. Furthermore, this allows the positions of the secondary light sources to be easily altered in space. Consequently, the virtual observer window can be displaced and, for example, track an eye of an observer should this be required.

A particularly flat illumination device, and hence a very compact structure of the holographic display apparatus, can be achieved if the illumination device comprises at least one light guide, for example a planar light guide, which has a cladding with a locally changeable refractive index for the purposes of forming discontinuities, and where the refractive index, and hence the amplitude of the out-coupled light, is adjustable locally set on the basis of the parameter of the illumination section illuminated by the out-coupled light.

Changing the refractive index in the cladding relative to the refractive index in the core of the light guide forms controllable outcoupling points. The light coupled into the light guide can consequently be coupled out of the light guide at defined points or locations in a targeted manner. Hence, the amplitude of the out-coupled light and the distribution of the amplitude of the out-coupled light can be influenced in targeted fashion by way of the light guide. Advantageously, the light can be redistributed between various regions of the light guide such that light saved in the case of darker illumination sections on the at least one spatial light modulation device can be fed to brighter illumination sections. This can achieve high contrasts of the three-dimensional representation while simultaneously having a low power consumption of the illumination device.

In a specific embodiment of the holographic display apparatus with a light guide with a cladding with a refractive index that is able to be altered locally to form discontinuities, provision can be made for the cladding to be designed as a liquid crystal layer that is controllable in pixelated fashion. The respectively controlled regions of the liquid crystal layer can be designed as a two-dimensional grating or as a one-dimensional arrangement of strips. The structure of the out-coupling points can be defined by an arrangement of control electrodes in the cladding. The size and shape of the illumination sections on the at least one spatial light modulation device can thus be adapted with great degrees of freedom to the respective requirements.

The amplitude of the light incident on the at least one spatial light modulation device in one or more illumination sections can be set in an advantageous configuration according to the invention by virtue of at least one enlargement device being provided, the latter comprising at least one grating element, where light of at least one light source is able to be supplied to the at least one enlargement unit.

Advantageously, according to the invention, provision can be made here for the light emanating from the at least one enlargement device to be able to be directed at the at least one spatial light modulation device, where the amplitude of the light fed to an illumination section of the at least one spatial light modulation device is adjustable on the basis of the parameter determined for the illumination section by adapting the amplitude of the light emitted by the at least one light source or at least one light source of an arrangement of at least two light sources and/or by adapting the amplitudes to be split by a beam splitter provided in the light path between at least one light source and at least one enlargement device, for example by controlling the polarization and using a polarization beam splitter, and/or by a local or whole-area adaptation of the transparency of an amplitude modulator provided in the light path between at least one light source and at least one enlargement device and/or by a local or whole-area change of the light out-coupling of the at least one grating element.

The preferably collimated light is fed to the at least one grating element, in particular a volume grating, at an angle that is as flat as possible relative to the surface thereof. To this end, an angle of incidence about 84 degrees, in particular of 84.2 degrees, is suitable for example. This can achieve an increase in the cross section of the incident light beam by a factor of, e.g., 10 in one direction. However, this configuration according to the invention should not be restricted to an angle of 84 degrees or 84.2 degrees. By way of example, a different increase in the cross section of the light beam can also be achieved by other suitable angles, to be precise by a factor of 1/cos of the angle. By way of example, the factor is approximately 5 in the case of an angle of approximately 75.5 degrees and the factor is approximately 20 in the case of an angle of approximately 87.1 degrees. As a result of a second grating element arranged orthogonal to the first, in particular a volume grating, the cross section of the light beam can also be increased in a second direction perpendicular to the first direction.

An anamorphic enlargement of the incident light beam in one direction can be brought about by the at least one grating element. Therefore, a particular configuration of the invention can provide for the at least one spatial light modulation device to be arranged upstream of the two grating elements in the light direction and thus increase the wave field downstream of the at least one spatial light modulation device in two directions, in each case by a desired factor, for example a factor of 10 in each case.

Electrically controllable switchable grating elements are known. Such a switchable grating element can be designed as a PDLCG (polymer dispersed liquid crystal grating), the refractive index modulation of which can be varied by means of an applied voltage. An applied voltage renders possible the alignment of dispersed liquid crystals in the field of electrodes. Since the deflection of the liquid crystal dipoles in the PDLC of a few degrees is sufficient to attain a sufficient refractive index modulation, i.e., in order to switch from a diffraction efficiency of η=1 to η=0 and vice versa, these switchable grating elements can be operated at a switching rate of more than 1 kHz. The use of liquid crystal allows working with voltages of the order of approximately 10 V. NLOP (non linear optical polymers) can also be used in the PDLCG instead of the liquid crystals. In this case, higher control voltages of greater than 10 V or even 100 V are required.

Adapting the amplitude of the one light source or of the plurality of light sources in respect of the control is easily and cost-effectively implementable. The use of a beam splitter advantageously facilitates the redistribution of light between different illumination sections on the at least one spatial light modulation device such that a high contrast can be attained. An amplitude modulator arranged between the light source or sources and the at least one enlargement device can have small external dimensions since the light beam was not yet expanded. Thus, it is possible to use cost-effective, high-contrast amplitude modulators.

If grating elements that are adjustable in terms of the light out-coupling are used, it may be the case that no additional optical elements are required for setting the amplitude of the light incident on the at least one spatial light modulation device. In the case of at least one enlargement device with two grating elements, the grating element facing the at least one spatial light modulation device preferably has a controllable embodiment. Here, the control can preferably be subdivided into sections horizontally and vertically. However, arrangements in which only the first grating element or both grating elements are controllable are also conceivable.

Then, suitably large illumination sections on the at least one spatial light modulation device can be facilitated, for example, if a holographic display apparatus is provided with a plurality of enlargement devices, in such a way that the illumination device comprises, e.g., two to twelve enlargement devices, preferably four enlargement devices. The enlargement devices can be arranged in the form of a tiling, where a virtually seamless illumination of the at least one spatial light modulation device arranged downstream in the light direction can be achieved in the case of four tiles. In the case of four tiles, the light sources can then be arranged laterally outside of the at least one spatial light modulation device top left and top right and bottom left and bottom right and illuminate the four enlargements devices from there.

A large-area illumination of the at least one spatial light modulation device with at the same time a small installation depth of the illumination device can be achieved by virtue of the invention if the illumination device is provided for feeding light to the at least one spatial light modulation device, where the illumination device comprises at least one light guide comprising a core layer and a coating layer which is arranged on the core layer and which tapers off along the propagation direction of the light or a coating layer with a changing or controllable refractive index along the propagation direction of the light, where the illumination device comprises at least one light source, the light of which is able to be coupled into the light guide and propagates in extensive fashion in the light guide, where the light guide comprises a deflection layer arranged on the coating layer, the evanescent wavefield of the light propagating in the light guide being able to be coupled out and deflected by said deflection layer, and where the amplitude of the light illuminating an illumination section is adjustable by sectional changes in the out-coupling efficiency of the deflection layer and/or the out-coupling efficiency of the coating layer and/or by changing the amplitude of the light emitted by the at least one light source or at least one light source of an arrangement of at least two light sources on the basis of the parameter determined for the respective illumination section.

Advantageously, if only the required light is coupled out of the light guide when the out-coupling efficiency of the deflection layer or the coating layer is changed, the remaining light proportion continues to propagate in the light guide. Therefore, only as much light as is required is coupled out at points with little light out-coupling. The onward propagating light is then available for regions with high light requirements. Such redistribution is particularly energy efficient. The change in the brightness of the light source or light sources is readily implementable.

In accordance with the preferred configuration of the holographic display apparatus according to the invention with a light guide, provision can be made for the deflection layer to be designed as at least one grating element, in particular as a volume grating, where the amplitude of the light illuminating an illumination section is adjustable by local or whole-area change in the light out-coupling of the at least one grating element, or for the coating layer to be designed as a liquid crystal layer, where the amplitude of the light illuminating an illumination section is adjustable by local or whole-area change in the refractive index of the liquid crystal layer.

The switchable grating element can be designed as a PDLCG, the refractive index of which can be varied by means of an applied voltage. Both the volume grating and a liquid crystal layer allow the amplitude of the out-coupled light to be set over a broad range. Here, areas of in each case the same light out-coupling can be adapted to the desired illumination sections of the at least one spatial light modulation device.

One configuration of the holographic display apparatus according to the invention with a small configuration and a large field of view can advantageously provide for the provision of a light deflection device, by which images of the at least one spatial light modulation device, for example arranged in a plane next to one another, e.g., horizontally or vertically, or arranged in succession in the depth, are generatable in succession, where, for each of the images, the amplitude of the light incident on the at least one spatial light modulation device is adjustable in a respective illumination section on the basis of at least the parameter determined for this illumination section and control signals to be written on the at least one spatial light modulation device are determinable for setting the amplitude from amplitude values adapted by the parameter.

In this case, the light deflection device brings about a segmented imaging of the at least one spatial light modulation device, as a result of which a plurality of segments are strung together and a large field of view can be implemented. The multiple image, composed of a plurality of imaging segments of the at least one spatial light modulation device, is generated successively in time, where in each case the at least one spatial light modulation device is written by the respective partial hologram. According to the invention, in the simplest case, the entire spatial light modulation device can correspond to one illumination section and the amplitude of the light fed to the at least one spatial light modulation device can be set for successively generated images in accordance with the respective parameter. However, it is also possible to provide for a plurality of illumination sections on the at least one spatial light modulation device such that the amplitude of the light incident on the at least one spatial light modulation device can be set differently in the various illumination sections during the generation of an image or an image segment of the multiple image.

A holographic display apparatus with a high amplitude contrast and a fine adjustability of the amplitude values can be embodied in such a way according to the invention that the at least one spatial light modulation device is designed as a complex-valued sandwich made of an amplitude modulator and a phase modulator, or that the at least one spatial light modulation device is designed as a phase modulator, preferably as a phase modulator controllable by means of multiphase encoding.

As a result of the multiphase encoding, the light in the phase modulator can be modulated in terms of its phase and its amplitude. An additional amplitude modulation, which has a multiplicative effect, can be attained by means of an amplitude modulator disposed upstream or downstream thereof. Consequently, it is possible to obtain a greater ratio of largest to smallest amplitude. Furthermore, the number of drivable amplitude values is increased in relation to a single amplitude modulator or phase modulator. The multiphase encoding can be determined analytically, or else by means of an iteration method. In this case, the iteration can be terminated after a few steps and the remaining amplitude deviations can be compensated by the amplitude modulator. The amplitude modulator can have a resolution that corresponds to the macro pixels on the phase modulator or a coarser resolution.

Advantageously, provision can be made for an illumination section to correspond to the size of a pixel of the at least one spatial light modulation device or the multiple size of a pixel or the size of a plurality of pixels combined to form a macro pixel for multiphase encoding or the size of a plurality of macro pixels, or for an illumination section to have a size in the range from 5 mm×5 mm to 50 mm×50 mm, preferably in a range from 10 mm×10 mm to 20 mm×20 mm.

As a result of relatively large illumination sections on the at least one spatial light modulation device, the control and the structure of the illumination device can be simplified substantially. Relatively small illumination sections offer the advantage of a more variable adaptation of the amplitudes of the light incident on the at least one spatial light modulation device, as a result of which a high reproduction quality of the three-dimensional scene can be facilitated.

To obtain a good use of the light provided by the at least one light source, provision can be made in a particularly advantageous configuration of the invention for the illumination device to have at least one diffractive optical element, where the diffractive optical element is provided for homogenizing the intensity distribution of the light fed to the at least one spatial light modulation device, or for the illumination device to comprise at least two diffractive optical elements, where one diffractive optical element or a first diffractive optical element is provided for homogenizing the intensity distribution of the light fed to the at least one spatial light modulation device and a further diffractive optical element or a second diffractive optical element is provided for homogenizing the phase profile.

Light, for example from laser light sources, can have an intensity that varies over the beam cross section. Laser radiation in the fundamental mode (TEM00 mode) has a Gaussian radiation profile. Advantageously, the phase profile in this case largely corresponds to a plane wave. The practice of expanding a light beam for illuminating a spatial light modulation device is known. Here, a sufficiently flat intensity distribution and hence a uniform brightness is achieved over the region of the spatial light modulation device despite the Gaussian distribution by virtue of the light beam being expanded until only a central part of the light beam strikes and covers the spatial light modulation device. However, this loses a significant component of intensity. Therefore, according to the invention, the Gaussian radiation profile is homogenized using a suitable diffractive optical element, which is now referred to as a beam shaping element here. Such beam shaping elements are known as "Gauss to top hat elements". The initial beam emitted by the light source can have a circular or rectangular profile, which is fitted particularly well to the shape of the at least one spatial light modulation device.

What could be disadvantageous in this procedure is that the phase of the light is influenced. Therefore, provision can be made for the phase profile to also be homogenized by means of a second diffractive optical element, which is preferably likewise a beam shaping element, and to be made to sufficiently approximate a planar wave. The function of the second beam shaping element can be taken into account when coding the at least one spatial light modulation device such that the latter can also adopt the correction of the phases.

There now are various options to advantageously configure the teaching of the present invention and/or combine the described exemplary embodiments or configurations with one another. To this end, reference should be made firstly to the patent claims dependent on the alternative independent patent claims and secondly to the following explanation of the preferred exemplary embodiments of the invention on the basis of the drawings, in which generally preferred configurations of the teaching are also explained. Here, the invention is explained in principle on the basis of the exemplary embodiments described without being intended to be restricted thereto.

BRIEF DESCRIPTION OF THE DRAWINGS

In the figures:

FIG. 12 shows a schematic illustration of a holographic head-mounted display in a side view.

Here, the same reference signs in the figures refer to the same or corresponding elements.

DETAILED DESCRIPTION OF THE INVENTION

Figure 1:
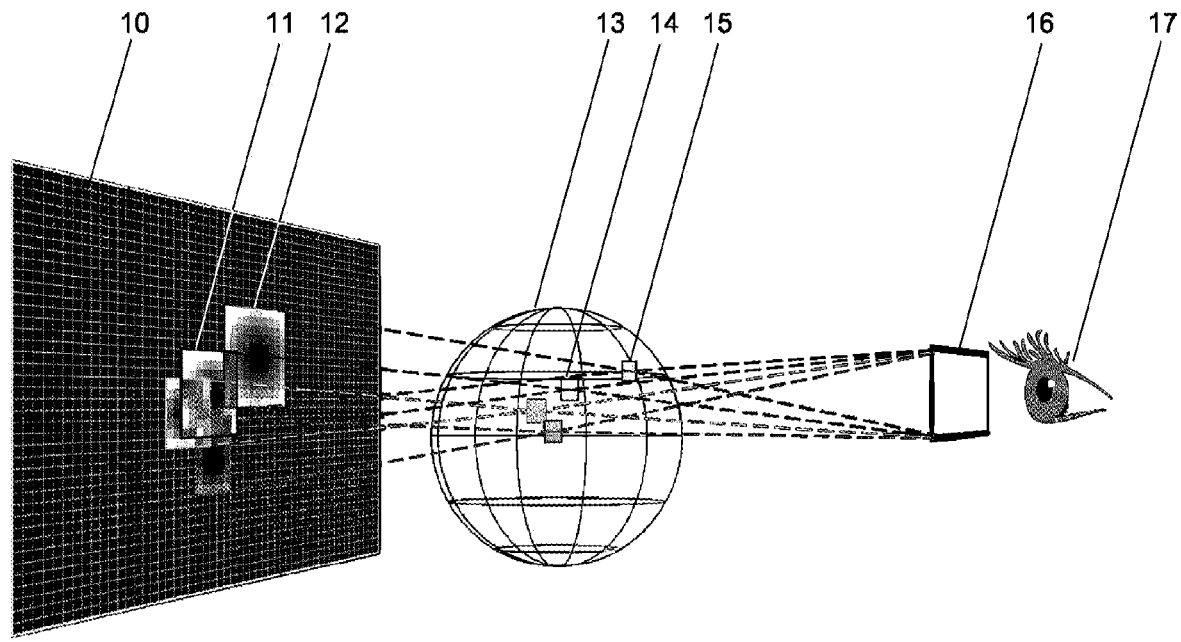
FIG. 1 shows a schematic perspective illustration of sub-holograms in a holographic display apparatus according to the prior art.

FIG. 1 shows a schematic perspective illustration of the generation of sub-holograms in a holographic display apparatus for displaying three-dimensional scenes according to the prior art. A hologram written or encoded in a spatial light modulation device (referred to as SLM below) 10 can be observed by an eye 17 through a virtual observer window 16. Then, with their eye 17 and with their second eye, not illustrated here, arranged in a further virtual observer window, an observer would observe a three-dimensional reconstruction of a scene 13. How the reconstructed scene 13 arises is illustrated in exemplary fashion by a first object point 14 and a second object point 15. To reconstruct the first object point 14, a first sub-hologram 11 is written into the spatial light modulation device 10. The center of the first sub-hologram 11 is located on a straight line through the first object point 14 to the center of the virtual observer window 16. The extent of the first sub-hologram 11 on the SLM 10 is ascertained with the aid of the intercept theorem, where the virtual observer window 16 is traced back through the first object point 14 on the SLM 10. In the same way, it is also possible to ascertain the position and the extent of the second sub-hologram 12 and of further sub-holograms on the SLM 10 from the virtual observer window 16 and the second object point 15 and further object points. What generally applies to object points between the SLM 10 and the eye 17 of the observer is that object points close to the eye 17 and hence far away from the SLM 10 require larger sub-holograms than object points lying close to the SLM 10 and further away from the eye 17. For object points located behind the SLM 10 as seen from the virtual observer window 16, the size of the sub-holograms likewise increases with distance from the SLM. This also means that object points appearing with the same brightness in the reconstructed scene 13 require sub-holograms with different amplitude values depending on their distance from the SLM 10. A first object point 14 located closer to the SLM 10 is linked to a smaller first sub-hologram 11 than a second object point 15 situated further away, which is linked to a larger second sub-hologram 12. To reach the same brightness of the first object point 14 and of the second object point 15, the smaller first sub-hologram 11 must have greater amplitude values than the larger second sub-hologram 12. This may increase the requirements in respect of the maximum representable contrast of the amplitude values and of the representable distinguishable amplitude values on the SLM 10. Distinguishable values must be generated both in the case of small and in the case of large amplitude values because otherwise the brightness levels of parts of the reconstructed scene 13 are represented incorrectly. Depending on the relative position of the object points in the reconstructed scene 13, the sub-holograms may be partly superposed. If the eye 17 is moved or likewise if the observer with the eye 17 moves, the virtual observer window 16 can be tracked and the hologram can be recalculated on the SLM 10.

Figure 2:
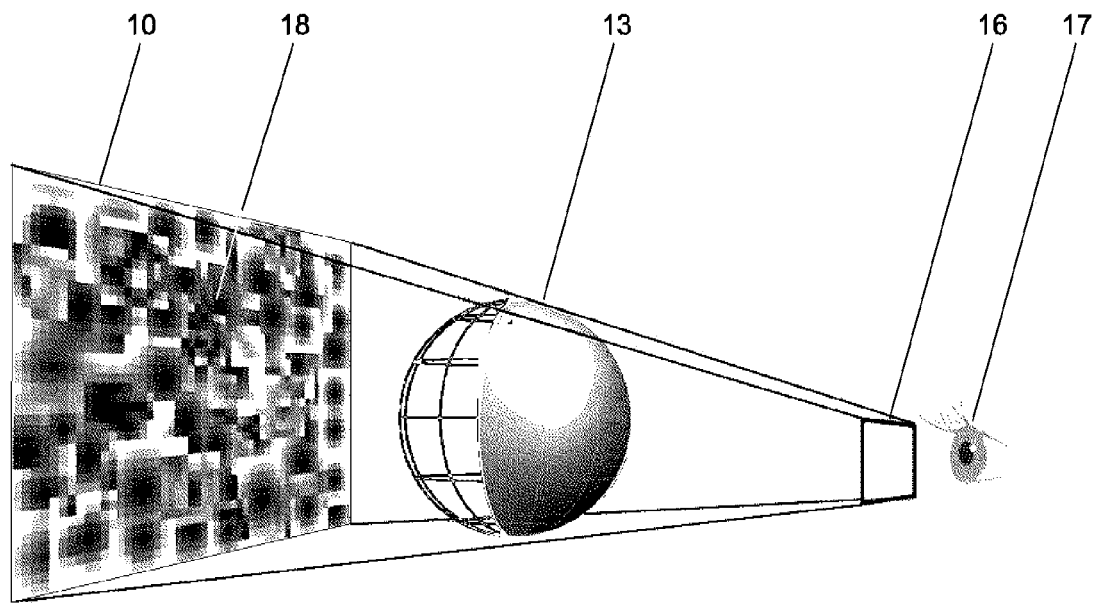
FIG. 2 shows a schematic illustration of the superposition of sub-holograms in the holographic display apparatus according to FIG. 1.

FIG. 2 shows a schematic illustration of the superposition of sub-holograms 18 on the SLM 10 for representing a three-dimensional scene 13. The multiplicity of object points in the scene 13 leads to a superposition of sub-holograms 18 on the SLM 10. As a result, the entire reconstructed scene 13 can be perceived by the eye 17 through the virtual observer window 16. What also applies here is that, as a result of the superposition of the sub-holograms 18, the requirements in relation to the representable amplitude differences and in relation to the resolution of the amplitude values may increase for a high-quality reproduction of a three-dimensional scene. The required amplitude values still are influenced by the brightness of the respective object point and, as explained in relation to FIG. 1, its distance from the SLM 10. Usually, the contrast of an SLM is specified as the ratio of maximum to minimum intensity. Contrasts of 1000:1 can be achieved using liquid crystal-based SLMs. The amplitude of the light, which substantially is the square root of the intensity, is decisive for a holographic representation. Consequently, the ratio of maximum to minimum representable amplitude in the above-described liquid crystal-based SLM is only 32:1. This restricted range may lead to a three-dimensional scene not being able to be represented with the desired contrast.

When controlling SLMs, it is usually conventional to control these with a restricted number of different adjustable values. In the case of an amplitude modulator with a resolution of 8 bits it is possible, for example, to drive 256 different amplitude values. This can lead to a restriction in the representability of object points with different brightness levels and object points arranged at different distances from the SLM 10. Thus, small brightness differences in night scenes may no longer be correctly representable on account of the restricted number of adjustable grayscale values, for example.

Figure 3:
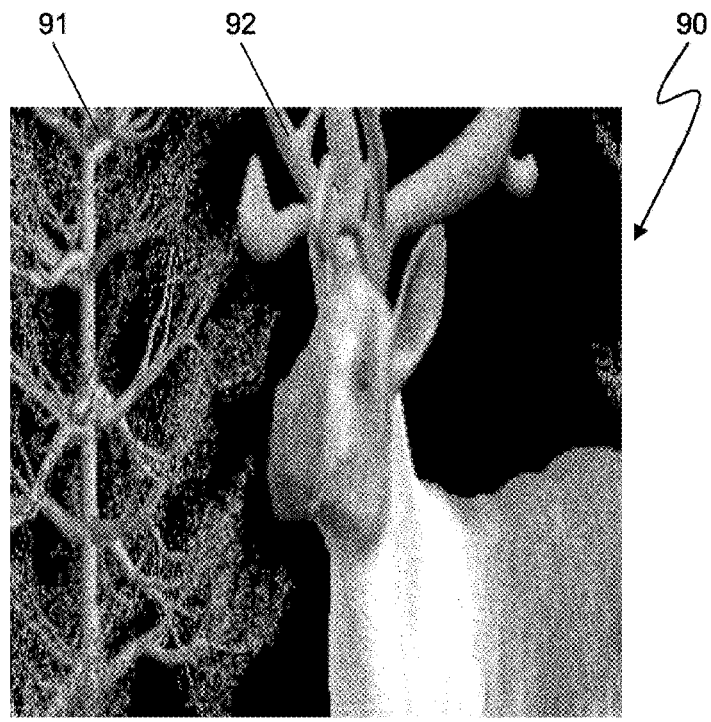
FIG. 3 shows a three-dimensional scene in a two-dimensional representation, FIG. 4a,b show an amplitude distribution of a complex-valued hologram of the three-dimensional scene shown in FIG. 3.

FIG. 3 shows a reconstructed three-dimensional scene 90 with a tree 91 and an elk 92 in a two-dimensional representation. In this example, the elk 92 is in the foreground near an observer observing the reconstructed scene. The tree 91 is in the background at a relatively large distance from the observer. On account of the different depth positions, sub-holograms of different sizes arise for object points of the tree 91 and object points of the elk 92 during the calculation. Moreover, the tree 91 has a finely resolved leaf structure and hence a lower density of object points, while the elk 92 has an extensive arrangement of object points and hence a higher point density. Although the object points in the foreground of the elk 92 and the object points at the trunk and at the leaves of the tree 91 have similar brightness levels, different amplitude values may arise on the hologram during the hologram calculation as a result of the depth position and density of the object points.

Figure 4A:
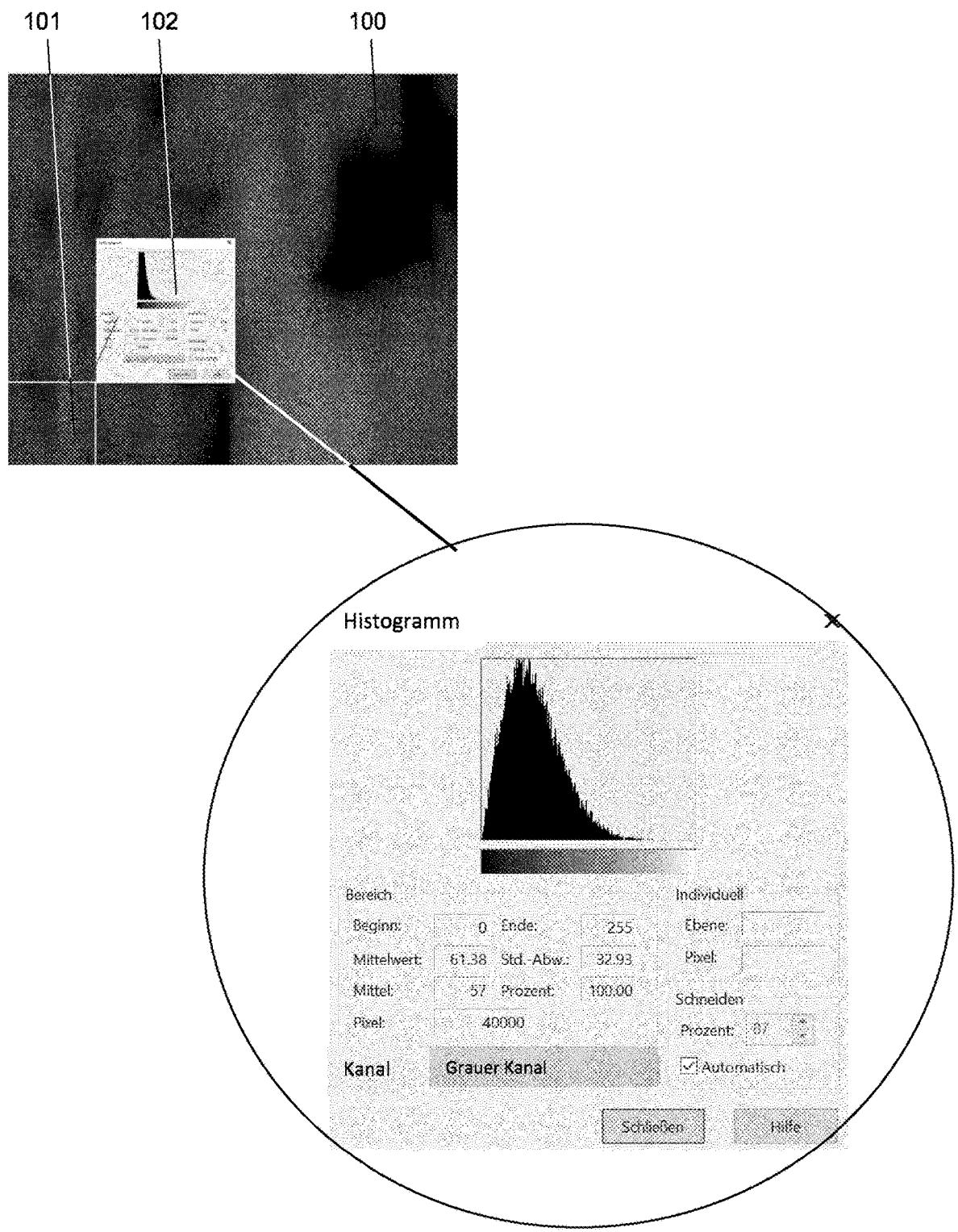

FIG. 4a shows an amplitude distribution 100 of a complex-valued hologram of the three-dimensional scene 90 shown in FIG. 3. The amplitude distribution 100 is calculated by virtue of calculating a sub-hologram for each object point and adding the sub-holograms. A distribution of amplitude values can be identified in the calculated amplitude distribution 100. A first amplitude distribution 102 is present in a square first hologram section 101. This amplitude distribution 102 is illustrated in FIG. 4a in the form of a histogram. In this example, a value of 25.6 is determined as mean grayscale value.

Figure 4B:
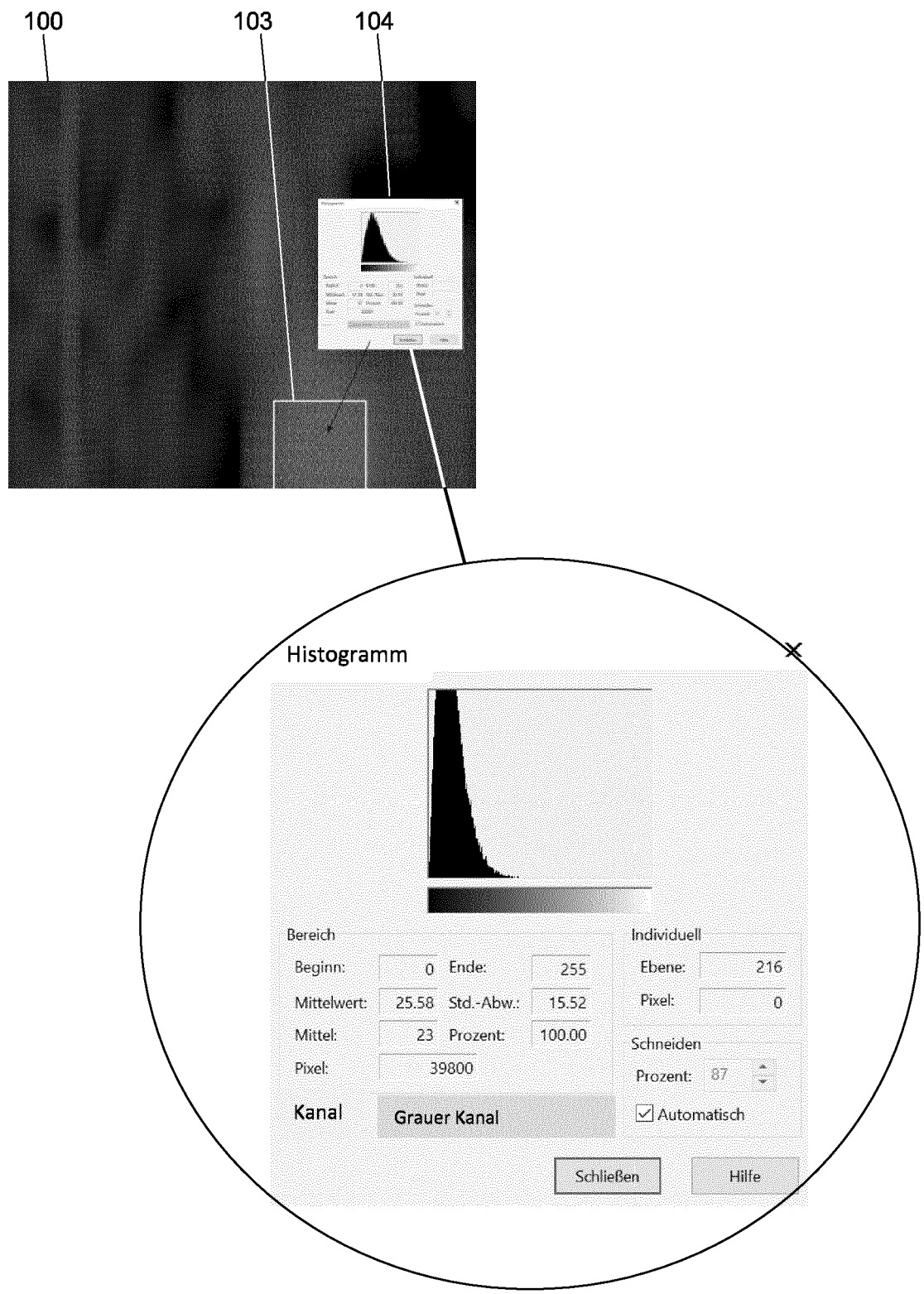

FIG. 4b likewise shows the amplitude distribution 100 of the complex-valued hologram of the three-dimensional scene 90 shown in FIG. 3. A second amplitude distribution 104 is present in a square second hologram section 103. Once again, the distribution of the amplitude values is shown in the form of a histogram. In this example, a value of 61.4 is determined as mean grayscale value.

As shown by the first and second amplitude distribution 102, 104 shown in FIGS. 4a and 4b, regions on the hologram with higher and lower amplitude values can form depending on the object of the scene to be represented. Here, as described in relation to FIGS. 1 and 2, the spatial arrangement of the object points to be represented amongst one another and in relation to the SLM are incorporated in the distribution of the required amplitude values in addition to the brightness of said object points to be represented. The amplitude distribution can change in successive scenes.

The contrast required to form the required amplitude values may exceed the setting range of the SLM under certain circumstances. Therefore, it is advantageous to illuminate different regions of the SLM with different brightness levels. In relation to the example shown in FIGS. 3, 4a and 4b, the first hologram section 101 is illuminated with a lower light amplitude than the second hologram section 103. In this case, the amplitude of the light incident on a hologram region of the SLM in a region is specified on the basis of a parameter. The parameter can be determined from the amplitude values in at least one illumination section of the SLM. An illumination section can comprise a set region of the SLM, within which the amplitude of the incident light can be set in a targeted fashion. In an iteration method for encoding the SLM for pure phase modulation, as described in relation to FIGS. 6 and 7, the parameter can be determined from target absolute values 126 or the absolute values of the complex values utilized there.

By way of example, in accordance with the exemplary embodiment shown in FIGS. 3, 4a, 4b, the first hologram section 101 can be illuminated darker by a parameter 25.6/61.4 used as a factor than the second hologram section 103. In the present case, the parameter is formed in the process from the ratio of the mean grayscale values of the first and second amplitude distributions 102, 104 shown in FIGS. 4a and 4b. The control values for setting the amplitude values on the SLM 10 are determined in exemplary fashion from the amplitude values of the first hologram section 101 multiplied by the inverse of the parameter. As a result, the mean values of the control values from the first amplitude distribution 102 and the second amplitude distribution 104 correspond to one another.

Figure 5:
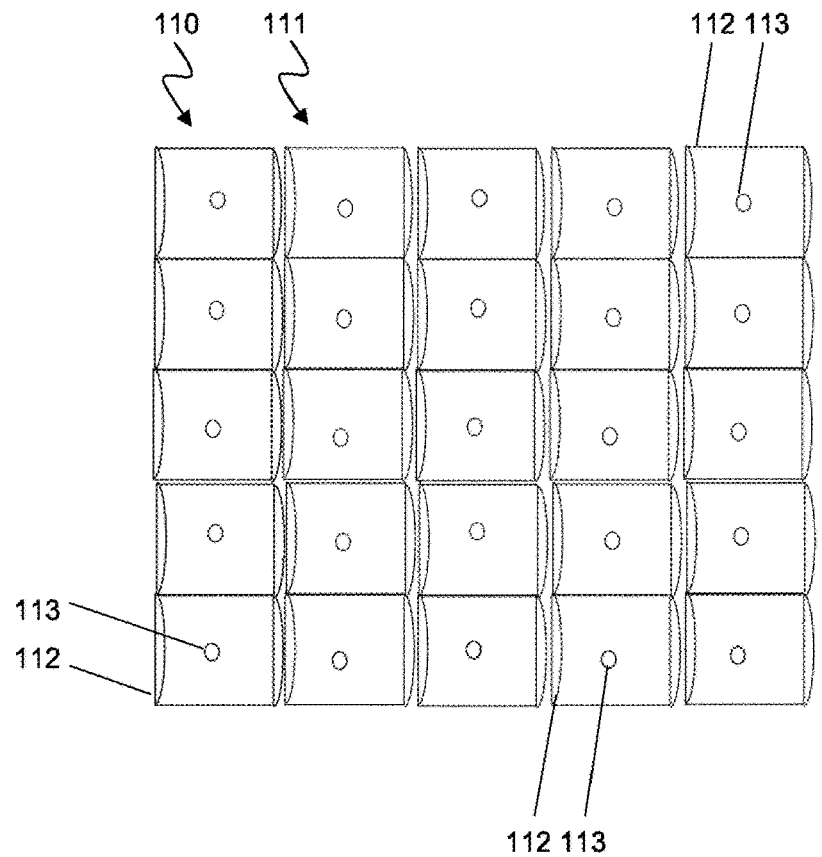
FIG. 5 shows a schematic illustration of an arrangement of imaging elements in conjunction with an arrangement of light sources.
Figure 8:
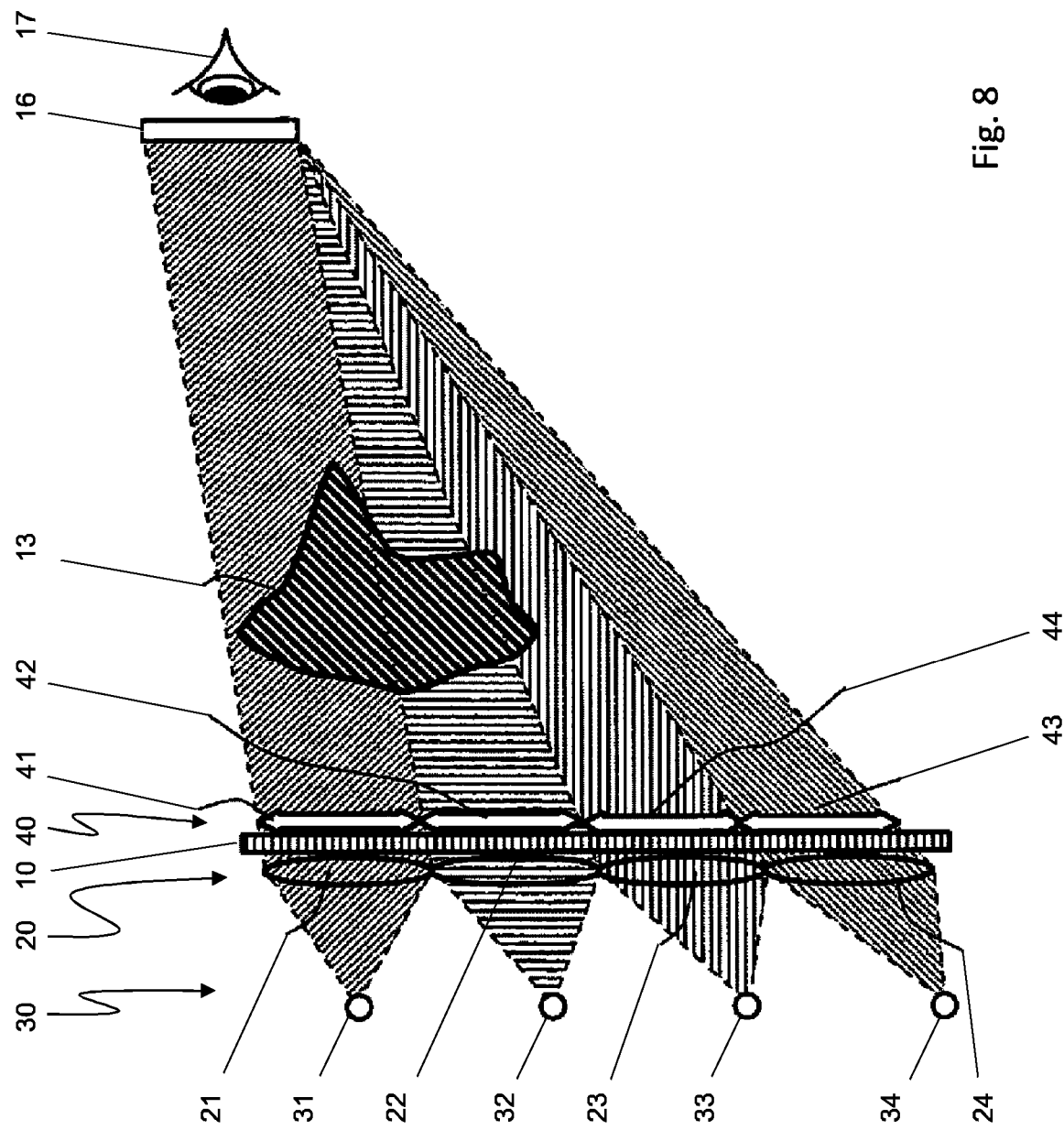
FIG. 8 shows a schematic illustration of a holographic display apparatus according to the invention with a light source arrangement and an arrangement of imaging elements, in a side view.

FIG. 5 shows a schematic illustration of an arrangement of imaging elements 110 and a light source arrangement 111, each with 5×5 elements. The imaging elements can be embodied as lens elements. The arrangement of imaging elements 110 and the light source arrangement 111 are part of an illumination device for illuminating the SLM 10. Each illustrated element is formed from an imaging element 112 and a light source 113 assigned to the imaging element 112. Each element shown is embodied to illuminate an illumination section 40, as shown in FIG. 8, of the SLM 10 shown in FIGS. 1 and 2. The brightness of the light sources 113 can be set on an individual basis. The amplitudes of the light fed to an illumination section 40 of the SLM 10 can accordingly be set in accordance with the parameter set for the illumination section 40. The shown arrangement of imaging elements in conjunction with the light sources 110, 111 therefore facilitates a differently bright illumination of 25 illumination sections 40 in this case. However, a plurality of elements can also be assigned to one illumination section 40 with a correspondingly larger embodiment.

In relation to the amplitude distribution 100, as shown in FIGS. 4a and 4b, the first amplitude distribution 102 can be determined in one illumination section 40 and the second amplitude distribution 104 can be determined in a further illumination section 40. The light source 113 which illuminates the illumination section 40 with the first amplitude distribution 102 is controlled in such a way that it emits light with a low amplitude in accordance with the parameter. The light source 113 which illuminates the illumination section 40 with the second amplitude distribution is controlled in such a way that it emits light with a higher amplitude in comparison with the first amplitude distribution, in accordance with the assigned parameter.

The control of the SLM 10 is adjusted in the individual illumination sections 40 to the respectively present amplitude of the light incident on the respective illumination section 40. The grayscale levels that are able to be set by means of the SLM 10 are therefore divided among the amplitude of the light fed to the respective illumination section 40 and no longer in relation to a maximum amplitude as present without an adjustment by means of the parameter. In this way, significantly finer gradation of the amplitude values of the light emitted by the SLM can be obtained in the case of a restricted number of representable grayscale levels. Small brightness differences of object points of a scene can thus be represented faithfully, for example even in the case of comparatively dark scenes. This also applies to object points arranged at different distances from the SLM 10. The representation of object points of equal brightness arranged at different distances from the SLM 10 is also facilitated by the finer adjustability of the amplitude values.

As a result of the differently bright illumination of the illumination section or sections 40 on the SLM 10, it is possible to significantly increase the contrast of the three-dimensional representation in relation to the pure amplitude setting by the SLM 10 alone.

Figure 6:
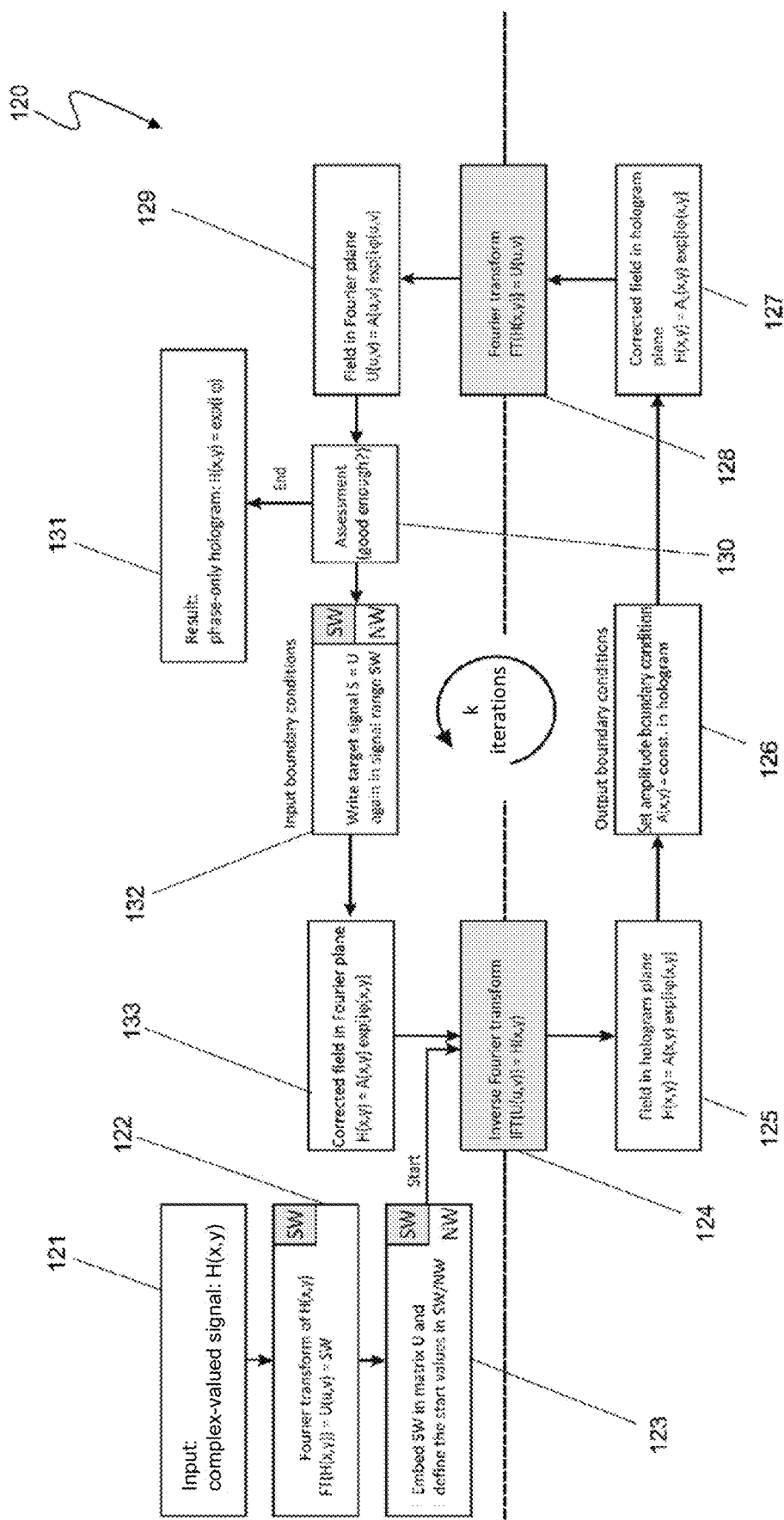
FIG. 6 shows a flowchart of an iterative method according to the prior art for determining phase encoding for a spatial light modulation device.

FIG. 6 shows a first flowchart 120 of an iterative method for determining phase encoding for an SLM according to the prior art. The iterative method is an adapted iterative Fourier transform algorithm (IFTA) between an observer plane, in which at least one virtual observer window is situated, and a hologram plane, in which an SLM is situated. The iterative method is a modified version of a known method of Gerchberg & Saxton (R. W. Gerchberg and W. O. Saxton, Optik 35, 237 (1972)). Before the iteration method runs through a certain number of iterations, the start values in the observer plane are initially defined in three steps. In a first step, a nominal complex-valued hologram signal function $Hi(x, y)$ which is able to generate a three-dimensional scene, as an input 121, is transformed by a Fourier transform in a preparation step 122 into a nominal complex-valued target value distribution $S(u, v)$ in the observer plane, which serves as a target function during the iterative optimization. By way of example, this can be undertaken using a discrete Fast Fourier Transform (DFFT). The nominal complex-valued target value distribution $S(u, v)$ represents the wave field in the virtual observer window, which is also referred to as signal range SW. The complex-value target value distribution $S(u, v)$ is embedded in a matrix $U(u, v)$ in an extension 123 in a second step, said matrix corresponding to the spatial resolution of the computer-generated hologram or of the phase modulating SLM on which the hologram is intended to be represented. The signal region SW takes up a portion of the area that is smaller than a periodicity interval of the SLM. The region of the matrix $U(u, v)$ not occupied by the target value distribution $S(u, v)$ is referred to as noise window NW. In a third step, the start value distribution in the noise window NW is defined within the extension 123. The complex-valued start value distribution in the noise window NW is freely selectable and serves as a parameter in the iteration method.

Now the actual iteration method starts; it alternately transforms back and forth between the spatial frequency domain in the observer plane and the object domain in the hologram plane in k iteration steps in order to incrementally minimize deviations from target values. Inverse Fourier transform (IFT) and Fourier transform (FT) methods are used. The iterative algorithm runs through the k iteration steps as follows:

(1) applying the inverse Fourier transform 124 to the matrix $U(u, v, k)$ for calculating the complex amplitude in the hologram plane 125

(2) setting a target absolute value 126 of the amplitude boundary condition as suitable constant value of the amplitude over the entire hologram on the SLM, and determining the corrected hologram function 127

(3) applying a Fourier transform 128 to the corrected hologram function 127 for calculating complex values in the observer plane 129, which has the signal region SW in the virtual observer window and the noise window NW located outside, (4) comparing signals 130 by means of a quality criterion such as, e.g., the signal-to-noise ratio (SNR) between the complex values calculated in the preceding step and the nominal complex-valued target value distribution, (5) setting the input boundary conditions in the observer plane, i.e., in this case, renewed writing 132 of the target value distribution into the signal region SW of the matrix U: $S(u, v) \rightarrow U(u, v, k)$, and (6) determining the corrected complex values in the Fourier plane 133.

The iteration loop is repeated until a specified termination criterion or quality criterion, for example for a signal-to-noise ratio, is satisfied or a specified number of iteration steps is reached. Ultimately, a result 131 is obtained, which is a two-phase or multi-phase hologram to be written into the SLM 10.

Figure 7:
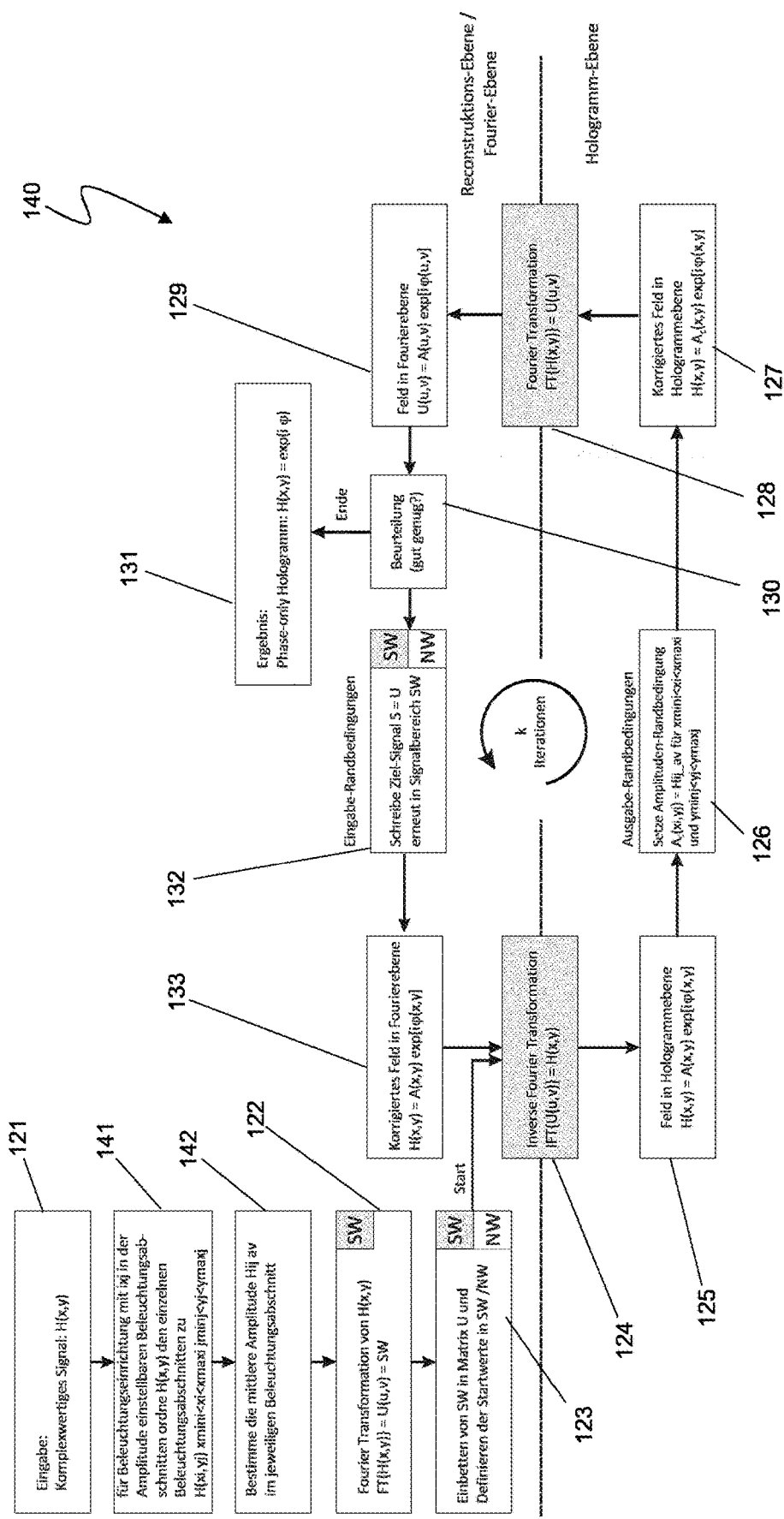
FIG. 7 shows a flowchart of an iterative calculation of a phase hologram according to the method according to the invention.

FIG. 7 shows a second flowchart 140 of an iterative calculation of a phase hologram according to the method according to the invention. The same reference signs as in FIG. 6 denote the same method steps. In the second flowchart 140, too, a target value distribution $S(u, v)$ is initially defined in the observer plane in three steps, which serve in the iteration as a comparison of the quality of the obtained approximation and also for writing into the signal region 132. In addition to these steps, a step 141 for the division into illumination sections has been incorporated. In this step, the illumination sections, e.g., according to FIG. 8, as provided on the SLM are specified for the iteration. The complex-valued signal $H(x,y)$ for representing a three-dimensional scene is assigned to the individual illumination sections, i.e., $H(x_i, y_j)$ with $xmini < x_i < xmaxi$ and $yminj < y_j < ymaxj$ belong to the illumination section with index i,j. Then, in a further step 142, an amplitude mean value or a mean amplitude $Hij\_av$ of the amplitudes $H(x_i, y_j)$ is determined in the respective illumination section as a parameter. To represent the three-dimensional scene, the amplitude of the light incident on the SLM is set in the respective illumination section on the basis of this parameter. In the iteration method according to the second flowchart 140, the target absolute value $Ac(x_i, y_j)$ 126 is inserted as amplitude boundary condition in each iteration step in accordance with the parameter. Here, provision can be made for the target absolute value $Ac(x_i, y_j)$ 126 in the respective illumination section to be determined before the start of iteration or after a first iteration step and to be set for the subsequent iterations. The target absolute value is set equal to the parameter $Ac(x_i, y_j) = Hij\_av$ in a preferred embodiment. In other embodiments, the target absolute value 126 in the respective illumination section can also be determined on the basis of the brightness of the object points to be reconstructed and/or on the basis of parameters of the sub-holograms, in particular the position of object points to be represented relative to the relative position of the SLM and/or the density of object points, and used for the entire iteration. The iteration method converges quicker as a result of the target absolute value 126 adapted thus. Moreover, the contrast capability of the SLM can be exploited to the effect of it being possible to represent higher contrast ratios and finer grayscale gradations.

In place of an iterative calculation with the aid of the Gerchberg & Saxton method, variants of an iterative calculation which use additional parameters such as, e.g., Fienup's method, are also known. In step (5): "Setting the input boundary conditions in the observer plane", a combination of K1*target value distribution+K2*actual value distribution, where K1 and K2 are constants, is written in the case of Fienup instead of writing 132 the target value distribution into the signal region again. The division into illumination sections and the use of the target absolute value 126 in the iterative calculation can be used not only in Gerchberg & Saxton, but also analogously in Fienup and in other possible variants of an IFTA algorithm.

In other embodiments, the target absolute value can also be adapted in each iteration step. By way of example, Ac(xi,yj) in step 126 can be ascertained as mean value of A(xi,yj) from the preceding step 125 in the respective illumination section. When the termination criterion of the iteration is reached, the parameter can then be set equal to Ac(xi,yj) from the last iteration step, for example.

FIG. 8 shows a schematic illustration of an embodiment of the holographic display apparatus according to the invention in a side view. The display apparatus comprises a light source arrangement 30 and an arrangement of imaging elements 20. First, second, third and fourth light sources 31, 32, 33, 34 belonging to the light source arrangement 30 extend perpendicular to the plane of the drawing. First, second, third and fourth imaging elements 21, 22, 23, 24 belonging to the arrangement of imaging elements 20 likewise extend perpendicular to the plane of the drawing. In this case, the imaging elements 21, 22, 23, 24 can be embodied as lens elements, in particular cylindrical lens elements. The light source arrangement 30 and the arrangement of imaging elements 20 illuminate an SLM 10. Each combination of a light source and an imaging element directs light onto an arrangement of illumination sections 40 on the SLM 10. In this case, the first light source 31 illuminates a first illumination section 41 of the SLM 10 through the first imaging element 21. The first light source 31 is arranged at a distance from the first imaging element 21 that equals the focal length of the latter such that the light reaching the virtual observer window 16 through the SLM 10 is collimated. The second light source 32 is arranged at a distance from the second imaging element 22 that equals the focal length of the latter such that the light reaching the virtual observer window 16 through the SLM 10 in a second illumination section 42 is likewise collimated. The arrangements for the third light source 33 and the fourth light source 34, the third imaging element 23 and the fourth imaging element 24 and a third illumination section 43 and a fourth illumination section 44 are the same in analogous fashion. For the reconstructed scene 13, different illumination sections 40 can be involved at the same object points. By way of example, the first and the second illumination section 41, 42 can contribute to reconstruct an object point, without the information thereof being different to the eye 17 or leading to conflicts. According to the invention, provision is made for parameters to be determined from the amplitude values calculated for the first, second, third and fourth illumination section 41, 42, 43, 44, for the first, second, third and fourth light source 31, 32, 33, 34 to be set in accordance with these respective parameters and for the control signals to be written on the SLM 10 to be determined from the amplitude values and the parameters.

If the SLM 10 is designed as a pure phase modulator and if the encoding of the SLM 10 is calculated according to an iteration method as per FIG. 7, the parameters for the illumination sections 40 are determined from the target absolute values 126 present after the termination criterion of the iteration has been reached or from the absolute values of the complex values in the illumination section 40 in the hologram plane present after the termination criterion of the iteration has been reached. The amplitude of the light incident on the SLM 10 in the respective illumination section 40 is set by appropriate control of the light source 31, 32, 33, 34 on the basis of at least the parameter.

By way of example, if control signals ranging between 0 and 127 are calculated in an 8-bit control for the first illumination section 41 from the amplitude distribution, the parameter is 0.5 and the amplitude of the first light source can be set to 50% of its maximum value. Consequently, its intensity can be reduced to 25%. The control signals for the amplitudes on the SLM 10 are stretched by the factor 1/parameter in the first illumination section 41 and cover a range from 0 to 254. Consequently, the entire scope of contrast of the SLM can be used and the representation of the brightness gradations of the three-dimensional representation can be improved.

Figure 9:
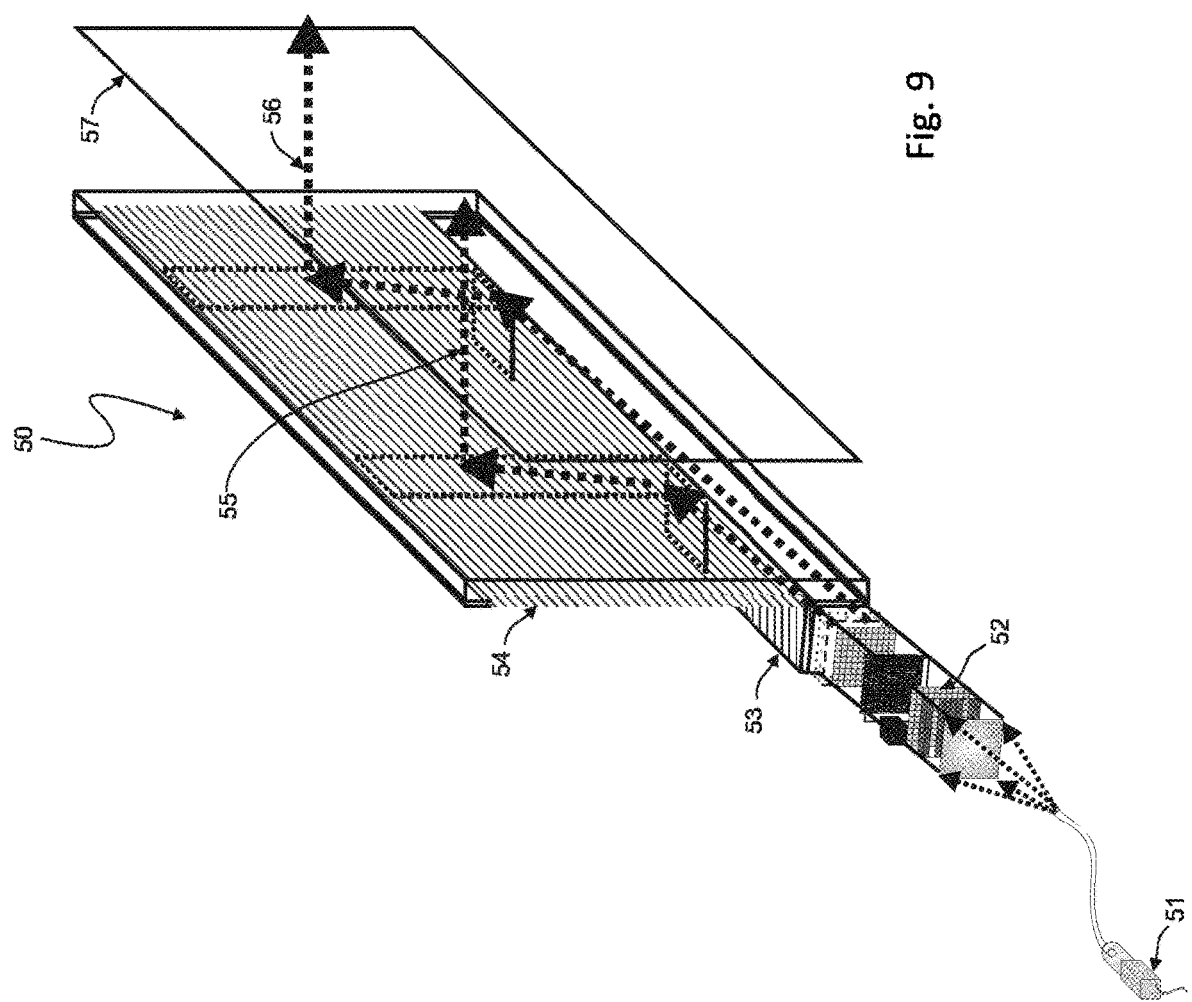
FIG. 9 shows a perspective schematic illustration of an illumination device of a holographic display apparatus with an enlargement device.

FIG. 9 shows a perspective illustration of an illumination device of a holographic display apparatus with an enlargement device 50. Light of a light source, preferably a laser light source, 51 is fed to a first grating element, in this case a volume grating, 53 via at least one diffractive optical element 52, which serves for or is embodied as a beam shaper, where the diffractive optical element is provided for homogenizing the intensity distribution of the light fed to the SLM. As a result, the cross section of the collimated light beam is increased in one direction by means of the enlargement device 50. In the case of an appropriate design of the angle of incidence of the light of the light source 51 and of the grating element 53, this can be by a factor of 10, for example. The cross section of the light beam is expanded in a second direction, perpendicular to the first expansion direction, by way of a second grating element, e.g., likewise a volume grating, 54, which is arranged perpendicular to the first grating element 53. As a result, the cross section of the light beam of the light source 51 is matched to the size of an SLM 57. Instead of the laser light source, use can also be made of a laser diode, an LED (light-emitting diode) or an OLED (organic light-emitting diode). Additionally, light from sources of different colors can be combined by way of a beam combiner. The at least one diffractive optical element, which acts as a beam shaper, can additionally act as a beam splitter for splitting the light fed to the SLM 57 as an additional function besides the homogenization of the intensity distribution, or the at least one diffractive optical element can additionally be combined with a beam splitter, for example also a polarization beam splitter which is able to be switched by way of polarization. Using such an embodiment of the diffractive optical element 52, the light of the light source 51 can then be shaped in such a way that a light path 55 and a further light path 56 are formed, which each pass over half of the enlargement device 50. Thus, two fields or segments of the enlargement device 50 are irradiated, where the field or segment of the light path 55 is guided from the left to the center and the field or segment of the further light path 56 is guided from the center to the right. The fields or segments each illuminate an illumination section of the SLM 57. The amplitude of the light fed to the respective illumination section is then adapted using the parameter determined from the amplitude distribution on the SLM 57 or in the iteration method and the control signals for the SLM 57 are determined from the parameter and the amplitude values.

In one possible embodiment, a light beam 51 is shaped by the diffractive optical element 52 in such a way that an output face of the enlargement device 50 that faces the SLM 57 can be supplied with a uniformly distributed amplitude. The first grating element 53 and/or the second grating element 54 are subdivided into controllable sections, which illuminate the illumination sections on the SLM 57. By controlling the grating elements 53, 54 in accordance with the parameters for the respective illumination section, it is possible to set the amplitude of the light fed to the SLM 57.

Advantageously, it is possible to choose the illumination sections to have sizes from 10 mm×10 mm to 20 mm×20 mm, without this intending to be construed as restrictive.

In another embodiment, the SLM can be arranged downstream of the diffractive optical element 52 and upstream of the first grating element 53 of the enlargement device 50 in the light direction. In this case, the illumination sections on the SLM are formed by beam splitters or controllable aperture arrangements or shutter arrangements by means of the diffractive optical element 52 within the scope of beam shaping. Along the extent of the beam, the illumination sections are imaged by enlargement in the enlargement device 50. In this case, the illumination sections on the SLM are preferably smaller, for example 2 mm×2 mm to 5 mm×5 mm, such that they are still imaged in enlarged fashion.

In their fundamental mode (TEM00 mode), laser light sources usually have a Gaussian beam profile. Therefore, only a central part of the Gaussian profile is used to obtain a uniform illumination of the SLM. However, this loses some of the intensity of the laser light source, as a result of which the power requirements of the display apparatus increase. Therefore, provision can be made here for two diffractive optical elements to be provided, that is to say one diffractive optical element or a first diffractive optical element and a further diffractive optical element or second diffractive optical element, which together serve or are embodied as a beam shaper. The one or first diffractive optical element is provided for homogenizing the intensity distribution of the light fed to the SLM, where the Gaussian beam profile is converted into a more uniform intensity distribution using this one or first diffractive optical element. However, this measure changes the phase profile and a plane wavefront is no longer present. Therefore, provision is made for the further or second diffractive optical element to be provided for the correction of the phase distribution, to the effect of a largely rectangular intensity distribution and a largely constant phase being present at the output of the combination of the first diffractive optical element and of the second diffractive optical element.

By way of example, the design of the two diffractive optical elements can be implemented by way of an iterative calculation. The phase values of the first diffractive optical element are optimized iteratively in such a way that a specified intensity distribution is approximated in the plane 2 downstream thereof. In this case, the phase profile in the plane 2 is used as a degree of freedom for the iteration. Then, the phase profile in plane 2 is also known as a result of this iterative calculation. Then, the second diffractive optical element can be created on the basis of the known phase profile, said second diffractive optical element substantially containing the difference phase between the generated profile and a plane wave.

The diffractive optical elements can be passive or actively controllable components.

In a further embodiment, an SLM small in terms of its dimensions, for example an LCoS (liquid crystal on silicon), can be illuminated by an expanded light beam. In this case, a first diffractive optical element is situated between a light source and an SLM. In computational terms, the first diffractive optical element is designed in such a way that an approximately constant light intensity is obtained approximately over the area of the SLM. A second diffractive optical element for phase correction is then situated near the SLM. In one option, when using a phase SLM, the functionality of the second diffractive optical element, specifically the correction of the phase values, can also be integrated in the phase SLM such that both the hologram and the correction for the incident light phase are written into the phase pixels of the SLM.

For a display apparatus or a display in which sequential light sources with different wavelengths are input coupled at the same position into a backlight, use can be made for example of active diffractive optical elements which, sequentially adapted to the light wavelengths, each realize a beam shaping and phase compensation. Advantageously, these diffractive optical elements are used in the beam path upstream of an expansion of the light beam; i.e., they are significantly smaller in terms of size than the actual SLM.

Figure 10:
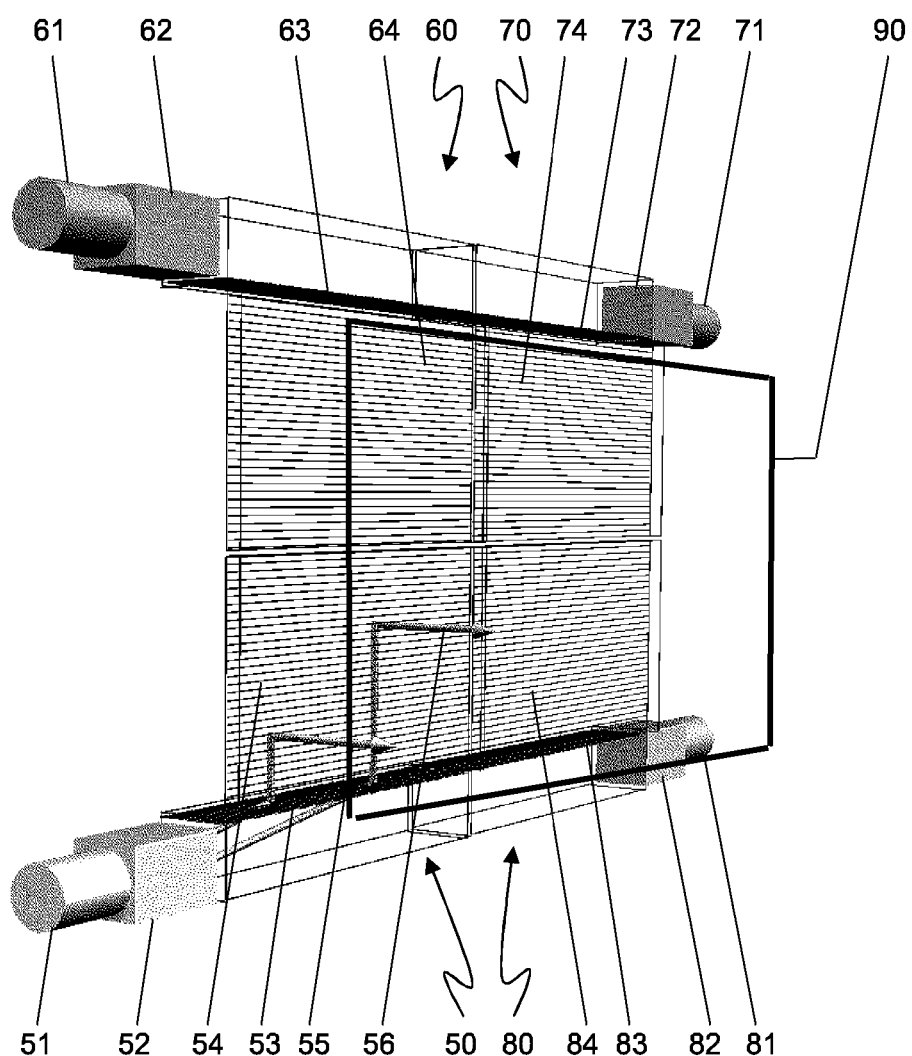
FIG. 10 shows a perspective schematic illustration of an illumination device of a holographic display apparatus with a multiple arrangement of enlargement devices and light sources, FIG. 11a,b show an illumination device with a light guide in schematic perspective illustrations.

FIG. 10 shows a perspective illustration of an illumination device of a holographic display apparatus with a multiple arrangement of enlargement devices 50, 60, 70 and 80 and light sources 51, 61, 71 and 81. In addition to the enlargement device 50 with a light source 51, known from FIG. 9, provision is made of a second enlargement device 60, a third enlargement device 70 and a fourth enlargement device 80. These enlargements devices 50, 60, 70 and 80 are impinged by the light from a second light source 61 via a second diffractive optical element 62 or a combination of two diffractive optical elements as a beam shaper, by light from a third light source 71 via a third diffractive optical element 72 or a combination of two diffractive optical elements as a beam shaper and by light from a fourth light source 81 via a fourth diffractive optical element 82 or a combination of two diffractive optical elements as a beam shaper. The diffractive optical elements 52, 62, 72 and 82 are embodied as beam shapers. The second enlargement device 60 comprises a third and a fourth grating element 63, 64, the third enlargement device 70 comprises a fifth and a sixth grating element 73, 74 and the fourth enlargement device 80 comprises a seventh and an eighth grating element 83, 84. In this case, the grating elements 53, 54, 63, 64, 73, 74, 83, 84 can likewise be embodied as volume gratings, with other grating elements naturally also being possible. In this case, the sections of an SLM 90 facing the areas of the second, fourth, sixth and eighth grating element 54, 64, 74 and 84 can be chosen as illumination sections on the SLM 90 disposed downstream of the enlargement devices 50, 60, 70 and 80. The amplitude fed to the SLM 90 is then chosen by setting the first, second, third and/or fourth light source 51, 61, 71, 81 in accordance with the respective parameter. The grating elements 53, 54, 63, 64, 73, 74, 83 and 84 or a part of these grating elements or portions of these grating elements can also have a controllable embodiment such that it is possible to form illumination sections on the SLM 90 in which the amplitude of the fed light can be set in accordance with the respective parameters. In a further possible embodiment, devices for influencing the amplitude in accordance with the respective parameter can be provided in the first, second, third and/or fourth diffractive optical element or a combination of two diffractive optical elements as beam shapers 52, 62, 72, 82, in each case on the entire cross section thereof. A finer gradation of the illumination sections on the SLM 90 can be achieved by virtue of designing portions of the cross sections of the diffractive optical elements or a combination of two diffractive optical elements as a beam shaper 52, 62, 72, 82 to be individually controllable.

As a result of the multiple arrangement of enlargement devices 50, 60, 70 and 80, it is possible to create a large holographic display apparatus which is almost seamless in its extent, which is equipped with the adaptation according to the invention of the amplitude of the light fed to the SLM 90 in the illumination sections.

FIG. 11a shows a perspective illustration of an illumination device with a light guide 150. The illumination device serves to illuminate an SLM not illustrated here. The light guide 150 comprises a light-guiding core 155 embodied as a layer, a coating layer 154 and a grating element, for example a volume grating, 153 arranged above a substrate 156. Laser diodes 151 are provided as light sources; these direct the light via a rod-shaped imaging element, in this case a half-cylindrical lens, 152 laterally onto the light guide 150 and hence onto the light-guiding core 155, with the light then being coupled into the light guide 150. Light-emitting diodes (LEDs) can also be used instead of the laser diodes 151. The evanescent wave field penetrating into the coating layer 154 guides the light to the grating element 153. This fed component of the light is diffracted in the direction of the SLM. The coating layer 154 tapers, not illustrated, along the light propagation direction or has a change in its refractive index along the light propagation direction. Raised above the illumination device, a collimated wavefront 157 is illustrated in FIG. 11a using dots, said wavefront propagating in the direction of the arrow so as to illuminate the SLM.

FIG. 11b shows a perspective illustration of an illumination device with a light guide 150, which has a similar design to the illumination device as per FIG. 11a. The same parts or components as in the illumination device as per FIG. 11a are provided with the same reference signs. In the illumination device, provision is made for the grating element 153, which has a controllable embodiment, to have a division 158, in this case four separately controllable parts by way of example, and so individual parts of the grating element 153 can be set independently of one another in terms of their outcoupling efficiency by the control values. In this way, illumination sections that are able to be illuminated independently of one another are formed on a downstream SLM, not illustrated here, in the light direction, in accordance with the number of separately adjustable parts of the grating element 153. The amplitude of the light fed to the SLM is set in the respective illumination sections by control values of the grating element 153 in accordance with the respective parameter.

FIG. 12 schematically shows a head-mounted display 160 in a side view. A reflective SLM 167 is provided as SLM in the head-mounted display 160. The SLM 167 is illuminated by a light source 164, which may be configured as a laser light source, for example, by way of a collimation optical unit 165, a deflection mirror 166 and a flat front side illumination 168. Light from the reflective SLM 167 is guided via a magnification optical unit 169 to a light deflection device 163. The light deflection device 163 brings about a multiple image representation of the SLM 167 in time multiplexing operation and generates a real composed intermediate image 162. The real composed intermediate image 162 is imaged into an eye 17 of an observer via an imaging element, in this case a curved mirror, 161. The magnification optical unit 169 ensures that the eye 17 perceives the multiple image representation of the SLM 167 at a specified virtual observer distance. With the aid of the magnification optical unit 169 and the light deflection device 163, the SLM 167 is imaged multiple times next to one another in one or two dimensions, i.e., for example, horizontally and/or vertically next to one another, and constructed as a real composed intermediate image 162 such that a high resolution SLM is formed or arises. By way of the imaging element 161, the holographic reconstruction generated by the composed intermediate image is perceived in once again magnified fashion. To generate a high-quality holographic reconstruction, a beam combining optical unit can be disposed downstream of the SLM 167 in order to obtain high-quality complex-valued modulation values. The amplitude of the light source 164 is adapted in accordance with the respective parameter for each of the image representations which make up the composed intermediate image 162 or the multiple image representation. There are various options as to how this adjustment of the amplitude of the light source 164 can be implemented. By way of example, if pulsed lasers are used as light sources, the amplitude of the light source 164 can be adapted either via the pulse duration or via the laser intensity during a fixed pulse duration or else by a combination of adapting the laser intensity and the pulse duration.

The invention is not restricted to the exemplary embodiments illustrated here. Moreover, further embodiments or exemplary embodiments are possible. Finally, very particular reference should be made to the fact that the exemplary embodiments described above only serve to describe the claimed teaching, the latter however not intending to be construed as restricted to the exemplary embodiments.

The invention claimed is:

1. A method for a three-dimensional representation of scenes comprising an illumination device and at least one spatial light modulation device for modulating incident light, where a hologram is encoded into the at least one spatial light modulation device and the hologram is composed of individual sub-holograms, in which an object point of an object of a scene to be reconstructed by the hologram is encoded in each case, where the at least one spatial light modulation device is illuminated with substantially coherent light by the illumination device in at least two illumination sections, where an amplitude distribution and a phase distribution for representing the scene and amplitude values and phase values derived therefrom are determined for encoding the at least one spatial light modulation device, and where an amplitude of the light incident on the at least one spatial light modulation device in the respective illumination section is set, by a component other than the at least one spatial light modulation device, on a basis of at least one parameter at least determined from the amplitude values in this illumination section.

2. The method as claimed in claim 1, wherein a virtual observer window in an observer plane is provided, a noise window being assigned to said observer window, where the at least one spatial light modulation device comprises a phase modulating light modulator, where control signals for controlling the at least one spatial light modulation device are determined in an iterative method, where the amplitude of the light incident on the at least one spatial light modulation device in the respective illumination section is set on the basis of at least the parameter.

3. The method as claimed in claim 2, wherein complex values of a light wavefield are assigned to the virtual observer window and the noise window, where a complex target value distribution of the light wavefield in the virtual observer window is determined from the scene, where the complex values in the observer plane are transformed into a hologram plane by means of an inverse transformation in an iteration step, where absolute values of the complex values in the hologram plane are set to a target absolute value for each illumination section, where the complex values obtained thus are transformed into the observer plane by means of a transformation and replaced by the complex target value distribution in the virtual observer window, where a parameter is determined in the hologram plane from the target absolute value in the respective illumination section present after a termination criterion of the iteration has been attained or from absolute values of the complex values in the respective illumination section after reaching a termination criterion of the iteration.

4. The method as claimed in claim 3, wherein the parameter is defined before a start of iteration and in that the target absolute value in the respective illumination section is equated to the parameter and remains the same for all iteration steps or in that the parameter is set after the termination criterion of the iteration has been reached and the target absolute value is adapted in each iteration step.

5. The method as claimed in claim 2, wherein the parameter is determined from average values of the absolute values of the complex values in the respective illumination section in the hologram plane present after a termination criterion of iteration has been reached.

6. The method as claimed in claim 2, wherein the target absolute value in the respective illumination section is determined before the start of the iteration or after a first iteration step from the absolute values of the complex values present in the hologram plane and/or in that the target absolute value in the respective illumination section is determined on a basis of the brightness of the object points to be reconstructed or on the basis of parameters of sub-holograms, or on the basis of parameters of sub-holograms being a position of object points to be represented relative to a relative position of the at least one spatial light modulation device or the density of object points.

7. The method as claimed in claim 1, wherein the at least one spatial light modulation device comprises an amplitude modulating light modulator, where control signals for controlling the at least one spatial light modulation device are determined, where the control signals serve to set amplitude values on a basis of at least the parameter and the amplitude values.

8. The method as claimed in claim 1, wherein the parameter is determined from a ratio of a maximum amplitude value in the respective illumination section to a maximum possible amplitude value on the at least one spatial light modulation device.

9. The method as claimed in claim 1, wherein the parameter is determined at least one of: on a basis of a brightness of the object points to be reconstructed, on a basis of parameters of the sub-holograms, or on a basis of parameters of the sub-holograms being a position of object points to be represented relative to a relative position of the at least one spatial light modulation device, and a density of object points.

10. The method as claimed in claim 1, wherein the illumination device comprises at least one light source, where an illumination section is illuminated by the at least one light source and where the at least one light source assigned to an illumination section is set in terms of its amplitude in accordance with the parameter determined for the illumination section, or in that the illumination device comprises at least one light source, where at least one secondary light source is generated by the light of the at least one light source, where an illumination section is illuminated by the at least one secondary light source and where the at least one secondary light source assigned to an illumination section is set in terms of its amplitude in accordance with the parameter determined for the illumination section.

11. The method as claimed in claim 1, wherein the illumination device comprises at least one light source, where the light of the at least one light source is fed via at least one switchable optical element to the at least one spatial light modulation device and where an amplitude of the light fed to an illumination section is set using the at least one switchable optical element on a basis of the parameter determined for the illumination section.

12. The method as claimed in claim 1, wherein the amplitude of the light fed to an illumination section is set continuously or discontinuously on a basis of the parameter determined for the illumination section or in that an amplitude averaged over a time interval is set on a basis of the parameter by pulse width modulation.

13. The method as claimed in claim 1, wherein the at least one spatial light modulation device is illuminated by at least two light sources with respectively assigned imaging elements, where each light source illuminates an illumination section of the at least one spatial light modulation device and where the amplitude of the light of the light source assigned to the respective illumination section is set in accordance with the parameter.

14. The method as claimed in claim 1, wherein the at least one spatial light modulation device is illuminated by at least one light source, where a shutter arrangement with portions that are continuously or discontinuously adjustable in terms of their transparency is arranged between the at least one light source and the at least one spatial light modulation device, where imaging elements are assigned to adjustable portions of the shutter arrangement, where each imaging element directs light to a separate illumination section of the at least one spatial light modulation device and where the amplitude of the light fed to the at least one spatial light modulation device in the respective illumination section is set in accordance with the parameter by controlling the adjustable portions of the shutter arrangement in respect of transparency or, averaged over a time interval, by pulse width modulation.

15. The method as claimed in claim 1, wherein the illumination device comprises a hologram device which is designed to be controllable fashion and in which a diffractive optical function is written in such a way that at least one primary light source is transformed into at least two secondary light sources by way of the writable diffractive optical function, where the at least two secondary light sources each illuminate illumination sections of the at least one spatial light modulation device and where the amplitude of the secondary light sources is set by at least one of controlling the hologram device, and/or by changing an amplitude of the at least one primary light source or at least one light source of an arrangement of at least two primary light sources on the basis of the parameter determined for the respective illumination section.

16. The method as claimed in claim 1, wherein the at least one spatial light modulation device is illuminated by at least one light guide with discontinuities for out-coupling of light, where light from at least one primary light source is coupled into the light guide, where the discontinuities form secondary light sources, which each illuminate illumination sections of the at least one spatial light modulation device, and where the amplitude of the secondary light sources is set by at least one of: changing the out-coupling efficiency of the discontinuities, and/or by changing the amplitude of the at least one primary light source or at least one light source of an arrangement of at least two primary light sources on the basis of the parameter determined for the respective illumination section.

17. The method as claimed in claim 16, wherein the at least one spatial light modulation device is illuminated by at least one light guide which has a cladding with a locally changeable refractive index for purposes of forming discontinuities, where the refractive index, and hence an amplitude of the out-coupled light, is set locally on a basis of the parameter of the illumination section illuminated by the out-coupled light.

18. The method as claimed in claim 1, wherein the light of at least one light source is fed to at least one enlargement device with at least one grating element.

19. The method as claimed in claim 18, wherein the light from the at least one enlargement device is fed to the at least one spatial light modulation device and where an amplitude of the light fed to an illumination section of the at least one spatial light modulation device is set on the basis of the parameter determined for the illumination section by adapting an amplitude of the light emitted by the at least one light source or at least one light source of an arrangement of at least two light sources or by adapting a beam splitter provided in the light path between at least one light source and at least one enlargement device or by a local or whole-area adaptation of the transparency of an amplitude modulator provided in the light path between at least one light source and at least one enlargement device or by a local or whole-area change of the light out-coupling of the at least one grating element.

20. The method as claimed in claim 1, wherein the at least one spatial light modulation device is illuminated by an illumination device comprising at least one light guide comprising a core layer and a coating layer which is arranged on the core layer and which tapers off along a propagation direction of the light or a coating layer with a changing or controllable refractive index along the propagation direction of the light, where light of at least one light source is coupled into the light guide and said light propagates in extensive fashion in the light guide, where the light guide comprises a deflection layer provided on the coating layer, said deflection layer out-coupling and deflecting an evanescent wavefield of the light propagating in the light guide, and where the amplitude of the light illuminating an illumination section is set by sectional changes in the out-coupling efficiency of the deflection layer or an out-coupling efficiency of the coating layer or by changing the amplitude of light emitted by the at least one light source or at least one light source of an arrangement of at least two light sources on a basis of the parameter determined for the respective illumination section.

21. The method as claimed in claim 20, wherein the deflection layer is formed by a grating element or wherein the deflection layer is formed by a volume grating, where the amplitude of the light illuminating an illumination section is set by local or whole-area change in a light out-coupling of the grating element, or in that the coating layer is formed by a liquid crystal layer, where the amplitude of the light illuminating an illumination section is set by local or whole-area change in the refractive index of the liquid crystal layer.

22. The method as claimed in claim 1, wherein images of the at least one spatial light modulation device are generated, where, for each of the images, the amplitude of the light incident on the at least one spatial light modulation device is set in the respective illumination section on a basis of at least one parameter determined from the amplitude values in this illumination section, and where control signals to be written into the at least one spatial light modulation device for setting amplitudes are determined from amplitude values adapted by the parameter.

23. The method as claimed in claim 1, wherein in a case of at least one spatial light modulation device with multi-phase encoding, control signals to be written into the at least one spatial light modulation device for setting phase values of individual pixels of the at least one spatial light modulation device are determined on a basis of at least the parameter and the amplitude distribution for representing the scene.

24. A holographic apparatus for a three-dimensional representation of scenes comprising an illumination device, at least one spatial light modulation device for modulating incident light and a computing device, where a hologram is encoded into the at least one spatial light modulation device and the hologram is composed of individual sub-holograms, in which an object point of an object of a scene to be reconstructed by the hologram is encoded in each case, where the at least one spatial light modulation device is illuminable with substantially coherent light by the illumination device in at least two illumination sections, where the computing device is designed to determine an amplitude distribution and a phase distribution for representing the three-dimensional scene and amplitude values and phase values derived therefrom for encoding the at least one spatial light modulation device, and where the illumination device is designed to set, by a component other than the at least one spatial light modulation device, an amplitude of the light incident on the at least one spatial light modulation device in the respective illumination section on a basis of at least one parameter determined from the amplitude values in this illumination section.

25. The apparatus as claimed in claim 24, wherein at least one switchable optical element which is adjustable over a whole area or in sections in terms of its transparency on a basis of the parameter determined for the illumination section is arranged upstream of the at least one spatial light modulation device in the light direction.

26. The apparatus as claimed in claim 24, wherein the illumination device comprises at least one light source with an assigned imaging element, where an illumination section of the at least one spatial light modulation device is illuminable by the at least one light source, where the amplitude of the light emitted by the at least one light source is adjustable in accordance with the parameter, or in that an amplitude of the light emitted by the at least one light source, averaged over a time interval, is adjustable in accordance with the parameter by way of pulse width modulation.

27. The apparatus as claimed in claim 24, wherein the at least one spatial light modulation device is illuminable by at least one light source, where a shutter arrangement with portions that are continuously or discontinuously adjustable in terms of their transparency is arranged between the at least one light source and the at least one spatial light modulation device, where imaging elements are assigned to adjustable portions of the shutter arrangement, where by means of each imaging element, light is directable to a separate illumination section of the at least one spatial light modulation device and where the amplitude of the light fed to the at least one spatial light modulation device in the respective illumination section is able to be set in accordance with the parameter by controlling the adjustable portions of the shutter arrangement in respect of transparency or by pulse width modulation.

28. The apparatus as claimed in claim 24, wherein the illumination device comprises a hologram device which is designed to be controllable and in which a diffractive optical function in a form of a hologram is writable in such a way that a transformation of at least one primary light source into at least two secondary light sources is provided by way of a writable diffractive optical function, where illumination sections of the at least one spatial light modulation device are illuminable in each case by the at least two secondary light sources, and where the amplitude of the light of the at least two secondary light sources is adjustable by at least one of: controlling the hologram device, and changing the amplitude of the at least one primary light source or at least one light source of an arrangement of at least two primary light sources on a basis of the parameter determined for the respective illumination section.

29. The apparatus as claimed in claim 24, wherein the illumination device comprises at least one light guide which has a cladding with a locally changeable refractive index for a purposes of forming discontinuities, and where the refractive index, and hence an amplitude of an out-coupled light, is adjustable locally on a basis of the parameter of the illumination section illuminated by the out-coupled light.

30. The apparatus as claimed in claim 24, wherein at least one enlargement device is provided, which comprises at least one grating element, where light of the at least one light source is feedable to the at least one enlargement device, where the light emanating from the at least one enlargement device is directable at the at least one spatial light modulation device, where an amplitude of the light fed to an illumination section of the at least one spatial light modulation device is adjustable on a basis of the parameter determined for the illumination section by adapting an amplitude of the light emitted by the at least one light source or at least one light source of an arrangement of at least two light sources or by adapting the amplitudes to be split by a beam splitter provided in the light path between at least one light source and at least one enlargement device or by a local or whole-area adaptation of the transparency of an amplitude modulator provided in the light path between at least one light source and at least one enlargement device or by a local or whole-area change of the light out-coupling of the at least one grating element.

31. The apparatus as claimed in claim 24, wherein the illumination device is provided for feeding light to the at least one spatial light modulation device, where the illumination device comprises at least one light guide comprising a core layer and a coating layer which is arranged on the core layer and which tapers off along the propagation direction of the light or a coating layer with a changing or controllable refractive index along a propagation direction of the light, where the illumination device comprises at least one light source, the light of which is able to be coupled into the light guide and propagates in extensive fashion in the light guide, where the light guide comprises a deflection layer arranged on the coating layer, an evanescent wavefield of the light propagating in the light guide being able to be coupled out and deflected by said deflection layer, and where the amplitude of the light illuminating an illumination section is adjustable by sectional changes in an out-coupling efficiency of the deflection layer or an out-coupling efficiency of the coating layer or by changing the amplitude of the light emitted by the at least one light source or at least one light source of an arrangement of at least two light sources on a basis of the parameter determined for the respective illumination section.

32. The apparatus as claimed in claim 31, wherein the deflection layer is designed as at least one grating element, or wherein the deflection layer is designed as a volume grating, where the amplitude of the light illuminating an illumination section is adjustable by local or whole-area change in a light out-coupling of the at least one grating element, or in that the coating layer is designed as a liquid crystal layer, where the amplitude of the light illuminating an illumination section is adjustable by local or whole-area change in the refractive index of the liquid crystal layer.

33. The apparatus as claimed in claim 24, wherein a light deflection device is provided, by which images of the at least one spatial light modulation device are generatable, where, for each of the images, the amplitude of the light incident on the at least one spatial light modulation device is adjustable in a respective illumination section on a basis of at least the parameter determined for this illumination section, and control signals to be written on the at least one spatial light modulation device for setting amplitudes are determinable from amplitude values adapted by the parameter.

34. The apparatus as claimed in claim 24, wherein the at least one spatial light modulation device is designed as a complex valued sandwich of an amplitude modulator and a phase modulator or in that the at least one spatial light modulation device is designed as a phase modulator, or in that the at least one spatial light modulation device is designed as a phase modulator that is controllable by means of multiphase encoding.

35. The apparatus as claimed in claim 24, wherein the illumination device comprises at least one diffractive optical element, where the diffractive optical element is provided to homogenize an intensity distribution of the light fed to the at least one spatial light modulation device or in that the illumination device comprises at least two diffractive optical elements, where one diffractive optical element is provided for homogenizing the intensity distribution of the light fed to the at least one spatial light modulation device and a further diffractive optical element is provided for homogenizing a phase profile.

36. A holographic apparatus for the three-dimensional representation of scenes comprising an illumination device, at least one spatial light modulation device for modulating incident light and a computing device, where the device is designed so as to carry out a method as claimed in claim 1.

* * * * *